United States Patent
Roberts et al.

(10) Patent No.: US 11,511,898 B1
(45) Date of Patent: Nov. 29, 2022

(54) RECEPTACLE FEEDING SYSTEM

(71) Applicant: Performance Feeders, Inc., Oldsmar, FL (US)

(72) Inventors: Chad Roberts, Gulfport, FL (US); Gregory Pflum, Odessa, FL (US)

(73) Assignee: Performance Feeders, Inc., Oldsmar, FL (US)

( * ) Notice: Subject to any disclaimer, the term of this patent is extended or adjusted under 35 U.S.C. 154(b) by 0 days.

(21) Appl. No.: 17/331,738

(22) Filed: May 27, 2021

Related U.S. Application Data

(63) Continuation of application No. 17/141,774, filed on Jan. 5, 2021, now Pat. No. 11,021,286.

(51) Int. Cl.
| | |
|---|---|
| *B65B 35/08* | (2006.01) |
| *B65B 35/26* | (2006.01) |
| *B65B 35/46* | (2006.01) |
| *B65B 35/56* | (2006.01) |
| *B65G 47/14* | (2006.01) |
| *B65B 5/10* | (2006.01) |

(52) U.S. Cl.
CPC ............ *B65B 35/56* (2013.01); *B65B 5/101* (2013.01); *B65B 35/08* (2013.01); *B65G 47/14* (2013.01)

(58) Field of Classification Search
CPC ......... B65B 35/26; B65B 35/08; B65B 5/101; B65B 35/46; B65B 35/56; B65G 47/14; B65G 47/1428
USPC ...................... 198/384, 392, 397.02, 397.05
See application file for complete search history.

(56) References Cited

U.S. PATENT DOCUMENTS

| | | | | |
|---|---|---|---|---|
| 3,662,872 A | * | 5/1972 | Nalbach | B65G 47/1457 198/400 |
| 4,174,775 A | * | 11/1979 | McKnight | B65G 47/1457 221/173 |
| 4,825,995 A | * | 5/1989 | Nalbach | B65G 47/1457 198/689.1 |
| 5,415,322 A | * | 5/1995 | Sala | B65G 47/1457 198/392 |
| 5,549,189 A | * | 8/1996 | Martisala | B65G 47/1457 198/380 |
| 6,065,587 A | * | 5/2000 | Schindel | B65G 47/1457 198/465.1 |
| 7,134,540 B1 | * | 11/2006 | Marti Sala | B65G 47/1457 198/392 |

(Continued)

*Primary Examiner* — Douglas A Hess
(74) *Attorney, Agent, or Firm* — Nicholas Pfeifer; Smith & Hopen, P. A.

(57) ABSTRACT

An article feeder assembly having a pocketed separator and a discharge tube configured to deliver articles to the pocketed separator. Some embodiments include an initial feeder assembly in overlying relation with a track extending from the initial feeder assembly to the discharge tube. Articles are oriented in end-to-end orientation in the initial feeder assembly and delivered to the pocketed separator in vertical end-to-end orientation. As pocketed separator rotates with respect to discharge tube, vertical retention members pass through a tunnel in the discharge tube and rotate articles out of the discharge tube. The discharged articles are secured in pockets delineated by the retention members. Some embodiments use one or more cam mechanisms to properly orient the discharged articles as the pocketed separator rotates. Properly oriented articles are then delivered to an advancing mechanism, such as a conveyor system.

19 Claims, 21 Drawing Sheets

(56) References Cited

U.S. PATENT DOCUMENTS

| | | | | |
|---|---|---|---|---|
| 7,258,222 | B2 * | 8/2007 | Marti Sala | B65G 47/256 198/393 |
| 7,565,959 | B2 * | 7/2009 | Nalbach | B65G 29/02 198/397.04 |
| 7,861,846 | B1 * | 1/2011 | Salditch | B65G 47/1457 198/392 |
| 7,950,517 | B2 * | 5/2011 | Marti Sala | B65G 47/1457 198/396 |
| 8,051,971 | B2 * | 11/2011 | Marti Sala | B65G 47/1457 198/450 |
| 8,096,403 | B2 * | 1/2012 | Marti Sala | B65G 47/256 198/384 |
| 8,701,865 | B2 * | 4/2014 | Forni | B65G 47/24 198/395 |
| 8,733,535 | B2 * | 5/2014 | Garcia | G01R 31/2893 198/397.03 |
| 9,586,768 | B2 * | 3/2017 | Marti | B65G 47/846 |
| 9,990,792 | B2 * | 6/2018 | DeRaedt | G07F 17/322 |
| 9,994,399 | B2 * | 6/2018 | Fallon | B65G 47/1457 |
| 10,138,073 | B2 * | 11/2018 | Fallon | B65G 47/681 |

* cited by examiner

RECEPTACLE FEEDING SYSTEM

CROSS-REFERENCE TO RELATED APPLICATIONS

This nonprovisional application is a continuation of and claims priority to nonprovisional application Ser. No. 17/141,774, entitled "RECEPTACLE FEEDING SYSTEM," filed Jan. 5, 2021 by the same inventor(s).

BACKGROUND OF THE INVENTION

1. Field of the Invention

This invention relates, generally, to feeding systems. More specifically, it relates to a receptacle feeding system.

2. Brief Description of the Prior Art

Receptacle feeding systems are designed to collect and organize a mass quantity of receptacles in a proper orientation to be filled in a production line. The rate of production of the production line is highly dependent on the feeding system. Unfortunately, conventional receptacle feeding systems are quite inefficient. In fact, the base line feeding system that was used in testing the improved effectiveness of the present invention was operating at a 30-40% efficiency rate. In other words, for every 100 receptacles delivered to the preexisting feeding system, only 30-40 receptacles were collected and oriented in the proper position to move to the filling station.

This level of inconsistency was previously overcome by increasing the diameter of the feeding system. The efficiency rate remained the same, but a higher quantity of receptacles could be handled by the feeding system. This approach however occupies valuable floorspace and is therefore an unacceptable solution in many instances.

Accordingly, what is needed is an improved, more efficient receptable feeding system. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved, more efficient receptable feeding system is now met by a new, useful, and nonobvious invention.

The novel structure includes an article feeder assembly having a pocketed separator configured to rotate about a rotational axis. The pocketed separator has a plurality of vertical pockets and a plurality of retention member. A pair of adjacent retention members at least partially establishes a pair of sidewalls of one of the vertical pockets. In some embodiments, each retention member has a height in a vertical direction that is at least 75% the height of the article that is intended to be discharged from the discharge tube.

The discharge tube includes a first end configured to receive articles and a second end proximate the pocketed separator for delivering articles to the pocketed separator. The discharge tube further includes a longitudinal axis extending through the discharge tube between the first and second ends and a tunnel extending laterally with respect to the longitudinal axis. The tunnel has an inlet aperture establishing an entrance to the tunnel and an outlet aperture establishing an exit from the tunnel. Each retention member is each sized and shaped to pass through the inlet aperture, the tunnel, and the outlet aperture in the discharge tube when the pocketed separator rotates relative to the discharge tube. As a result, an article located within the discharge tube at the second end of the discharge tube can be rotated out of the outlet aperture of the discharge tube when contacted by a retention member rotating through the tunnel in the discharge tube.

In some embodiments, the outlet aperture in the discharge tube is greater in height than the size of the inlet aperture in the discharge tube. As a result, the articles can more easily exit the outlet aperture.

Some embodiments further include an initial feeder assembly in overlying relation to the pocketed separator, wherein the initial feeder assembly is configured to deliver articles to the discharge tube in end-to-end orientation. Some embodiments include a track extending from the initial feeder assembly to the discharge tube.

Some embodiments further include a knockdown cam. The knockdown cam is circumferentially spaced from the discharge tube in a direction of rotation of the pocketed separator and is configured to force any standing articles onto their respective sides.

Some embodiments also include a plurality of trenches centripetally located with respect to the plurality vertical pockets. Each trench is radially aligned with a radially adjacent vertical pocket.

Some embodiments further include a centripetal mover configured to force an article lying on the pocketed separator in a radial direction towards the central rotational axis and onto one of the plurality of trenches. Some embodiments include a centrifugal cam configured to force an article, lying in one of the plurality of trenches, in a radial direction away from the central rotational axis and in overlying relation to an opening in a divider floor such that articles fall into the opening in an upright orientation. Some embodiments include an advancing system, such as a conveyor belt on which articles in an upright orientation are delivered.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

The present invention includes an article feedings system with greater efficiency than conventional feeding systems. In some embodiments, the article is a receptacle needing to be properly oriented within the feeding system.

Figure 1:
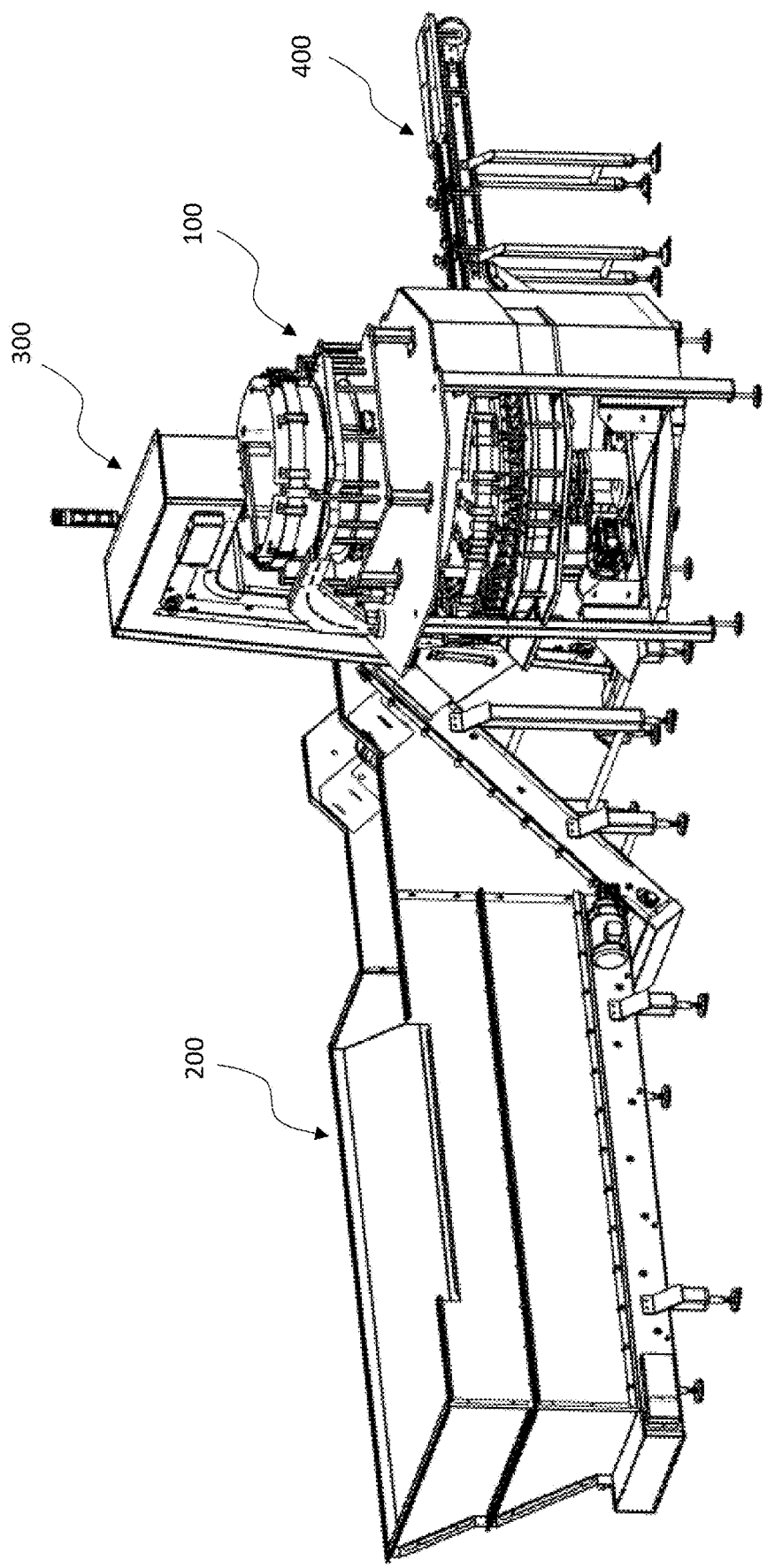
FIG. 1 is a perspective view of an embodiment of the feeder system assembly of the present invention.

As shown in FIG. 1, an embodiment of the present invention includes a complete system having feeder assembly 100 operably engaged with staging hopper 200, delivery hopper 300, and conveyor assembly 400. Each of the staging hopper 200, delivery hopper 300, and conveyor assembly 400 can be generic devices and assemblies known to a person of ordinary skill in the art. Staging hopper 200 transports articles to delivery hopper 300, which deposits the articles into feeder assembly 100. At the downstream end of the feeding system, feeder assembly 100 deposits articles onto the conveyor belt and conveyor assembly 400 delivers the articles to their next destination in a production line. In some embodiments, conveyor assembly 400 can be any advancing system or mechanism known to a person of ordinary skill in the art to move the articles downstream in the production line.

In some embodiments, delivery hopper 300 eliminates overloading or insufficient article loads, which could prevent feeder assembly 100 from functioning properly. In some embodiments, the feed rate from the delivery hopper 300 can be metered by a level control switch and adjusted to operate at a desired feed rate.

Figure 2:
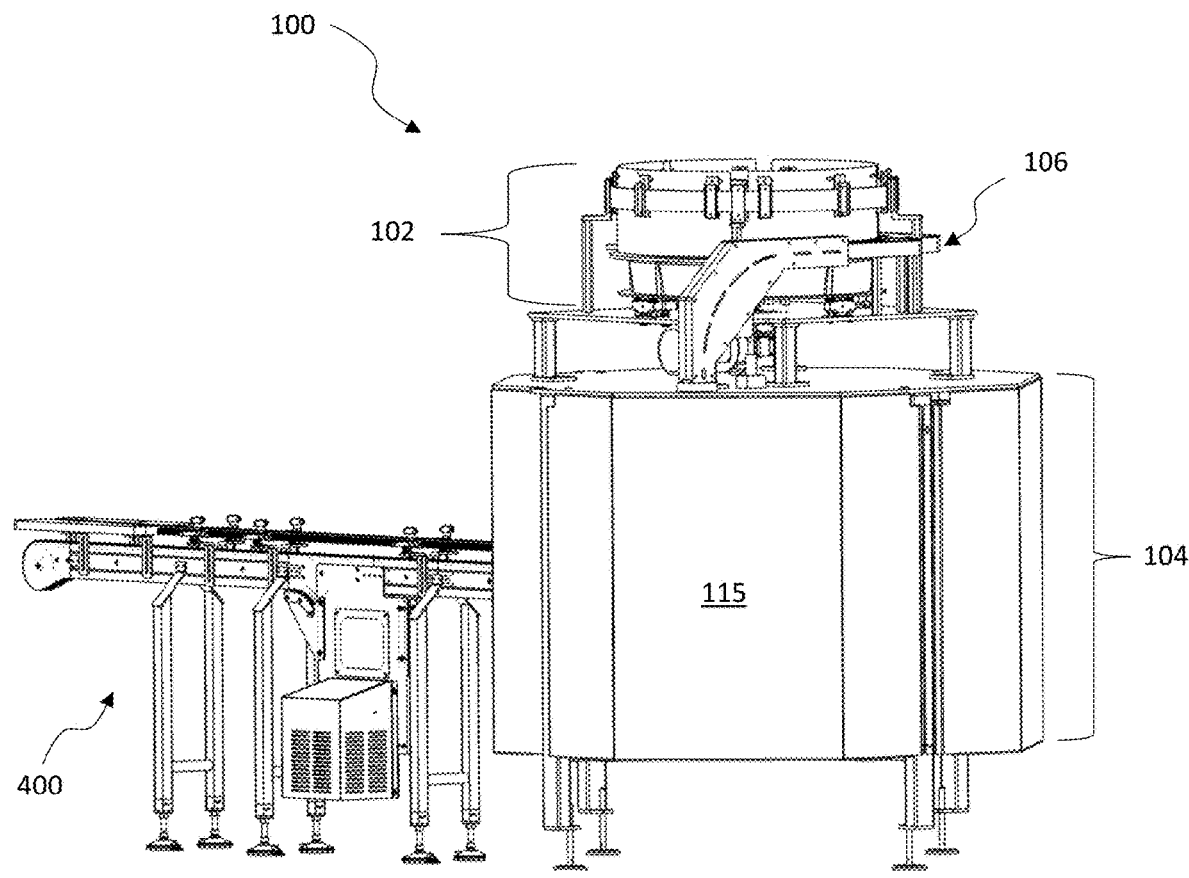
FIG. 2 is a perspective view of an embodiment of the feeder assembly operably arranged with a conveyor system.

As shown in FIG. 2, an embodiment of feeder assembly 100 is a stacked system with initial feeding assembly 102 in overlying relation to primary feeder assembly 104. The stacked relation provides a significant reduction in the footprint of the feeder assembly 100, which has a significant impact on the end user's ability to optimize valuable floorspace. In addition, the stacked system enabled the system to obtain a 100% load ratio and obtain maximum efficiency during testing.

To account for the stacked orientation, an embodiment of the present invention includes track 106, which delivers articles from initial feeding assembly 102 to primary feeder assembly 104. The design and features of track 106 will be discussed in greater detail below.

In some embodiments, as depicted in FIG. 2, primary feeder assembly 104 is enclosed in a plurality of sidewalls 115 to ensure that the system can operate safely without fear of foreign objects coming in contact with the internal components. Alternatively, some embodiments, may lack sidewalls 115 or may have access panels disposed at key locations for accessing certain components of primary feeder assembly 104.

Figure 3:
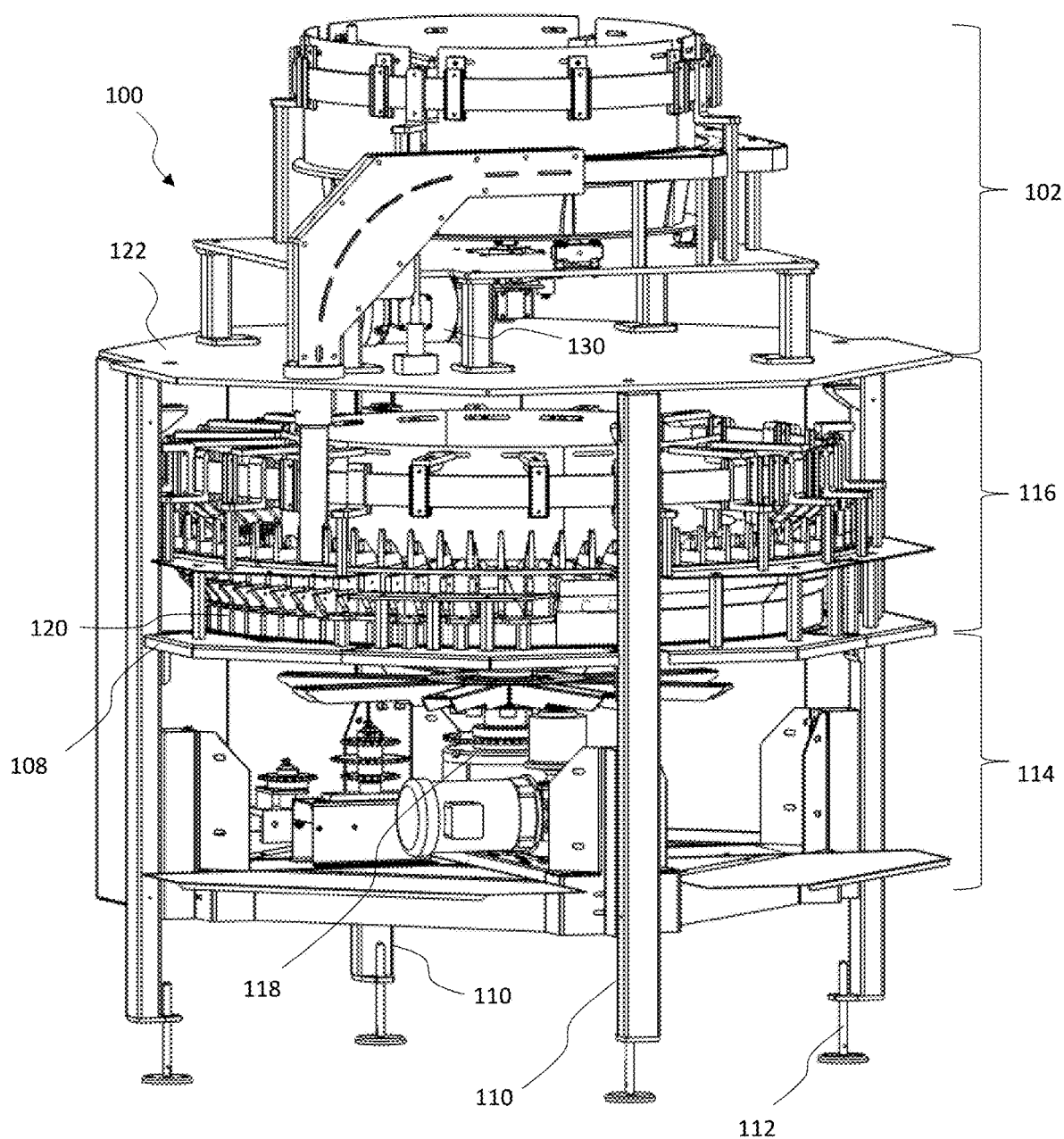
FIG. 3 is a perspective view of an embodiment of the feeder assembly with the outer housing removed.

As shown in FIG. 3, feeder assembly 100 includes a structural foundation including vertical supports 110, with adjustable feet 112 for leveling feeder assembly 100. Feeder assembly 100 further includes sectional flooring 108 that generally separates lower housing 114 from upper housing 116.

Lower housing 114 houses the powertrain used to drive feeder assembly 100. The powertrain may include any number and/or combination of known machines to operate feeder assembly 100, including but not limited to primary drive motor 118, which is configured to drive the rotation of pocketed feeder 120.

Upper housing 116 resides between bottom plate 108 and top plate 122, and houses pocketed feeder 120. Upper housing 116 further includes a plurality of sorting devices and sensors to ensure that the articles being sorted are properly oriented and moving at a desired feed rate.

Figure 4:
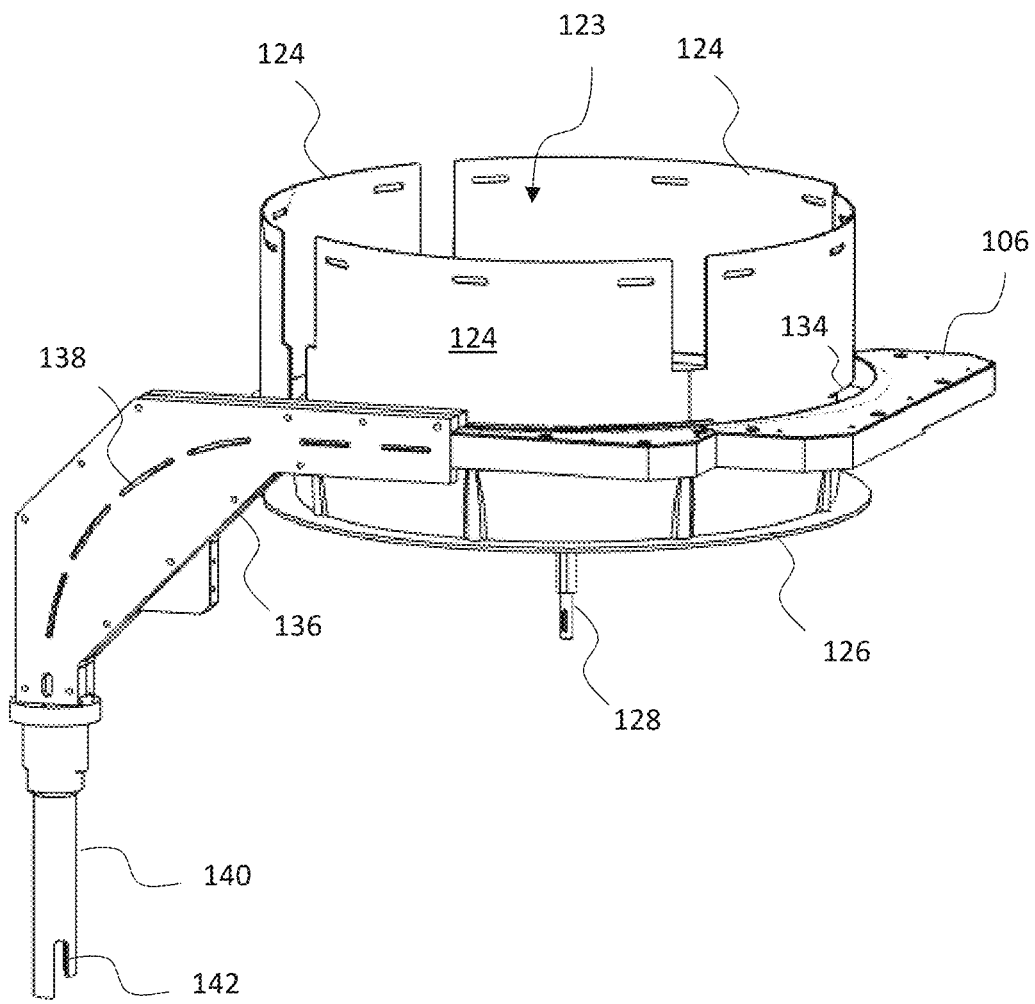
FIG. 4 is a perspective view of an embodiment of the initial feeder assembly.
Figure 5:
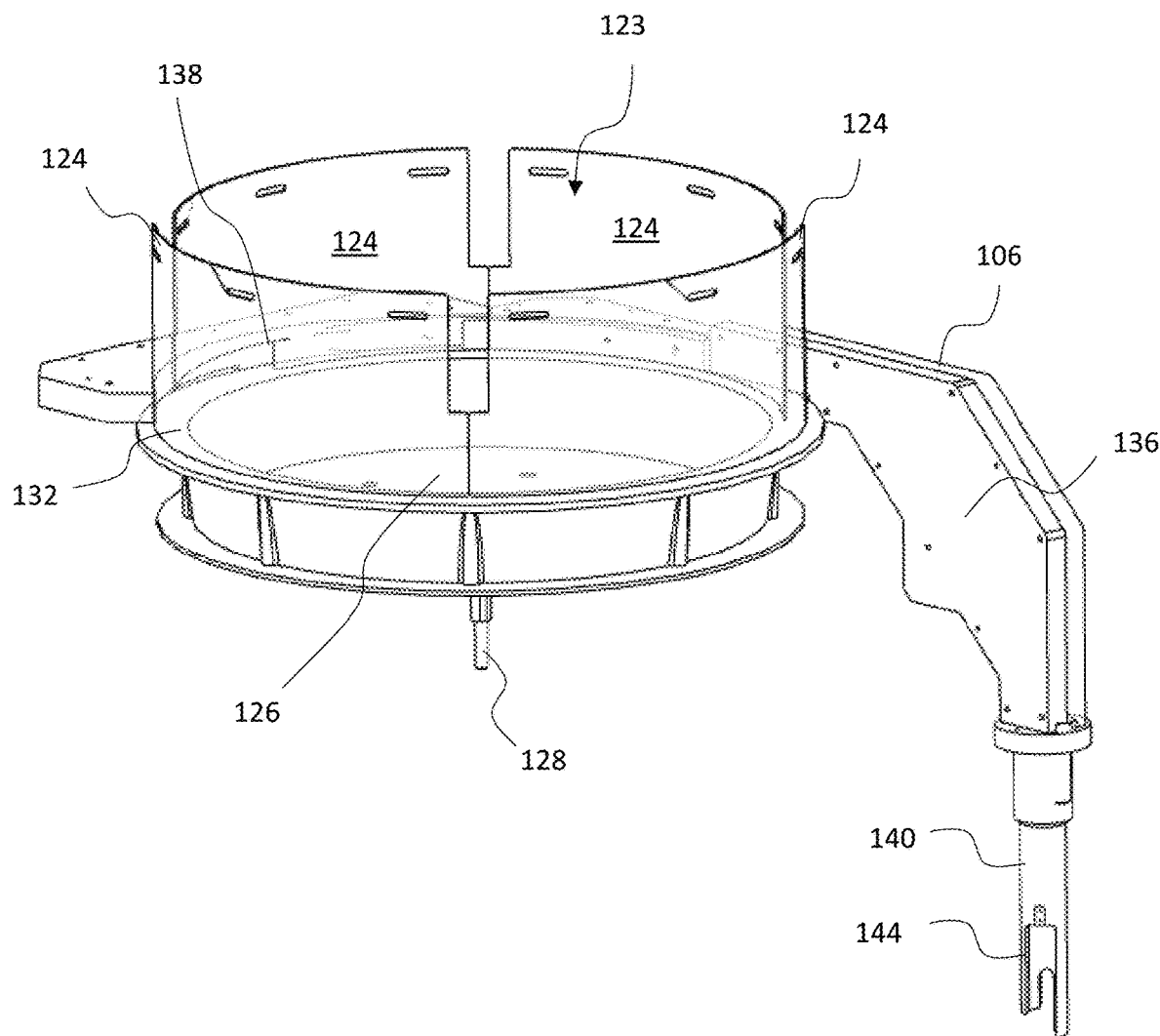
FIG. 5 is a perspective view of an embodiment of the initial feeder assembly.
Figure 6:
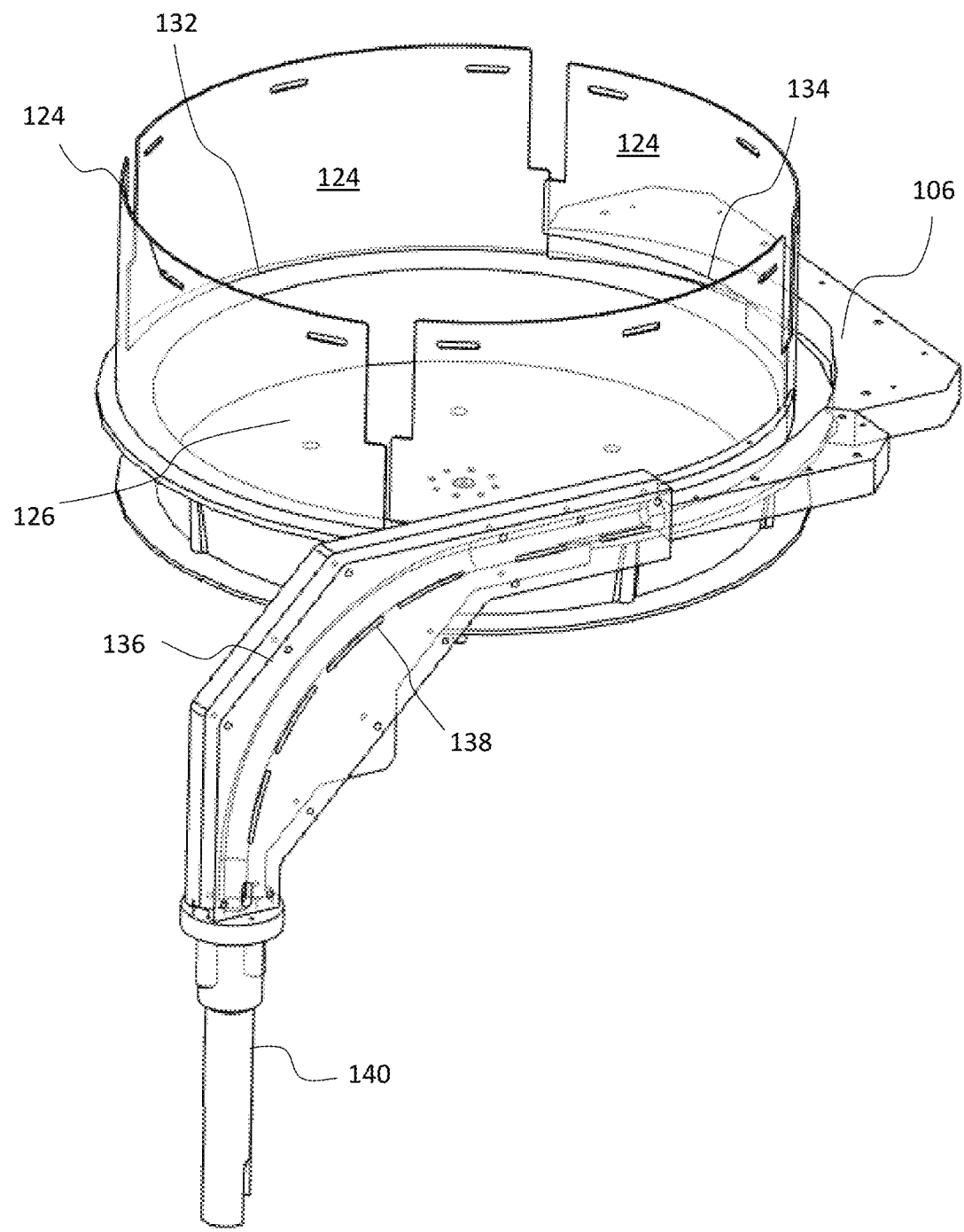
FIG. 6 is a perspective view of an embodiment of the initial feeder assembly.
Figure 7:
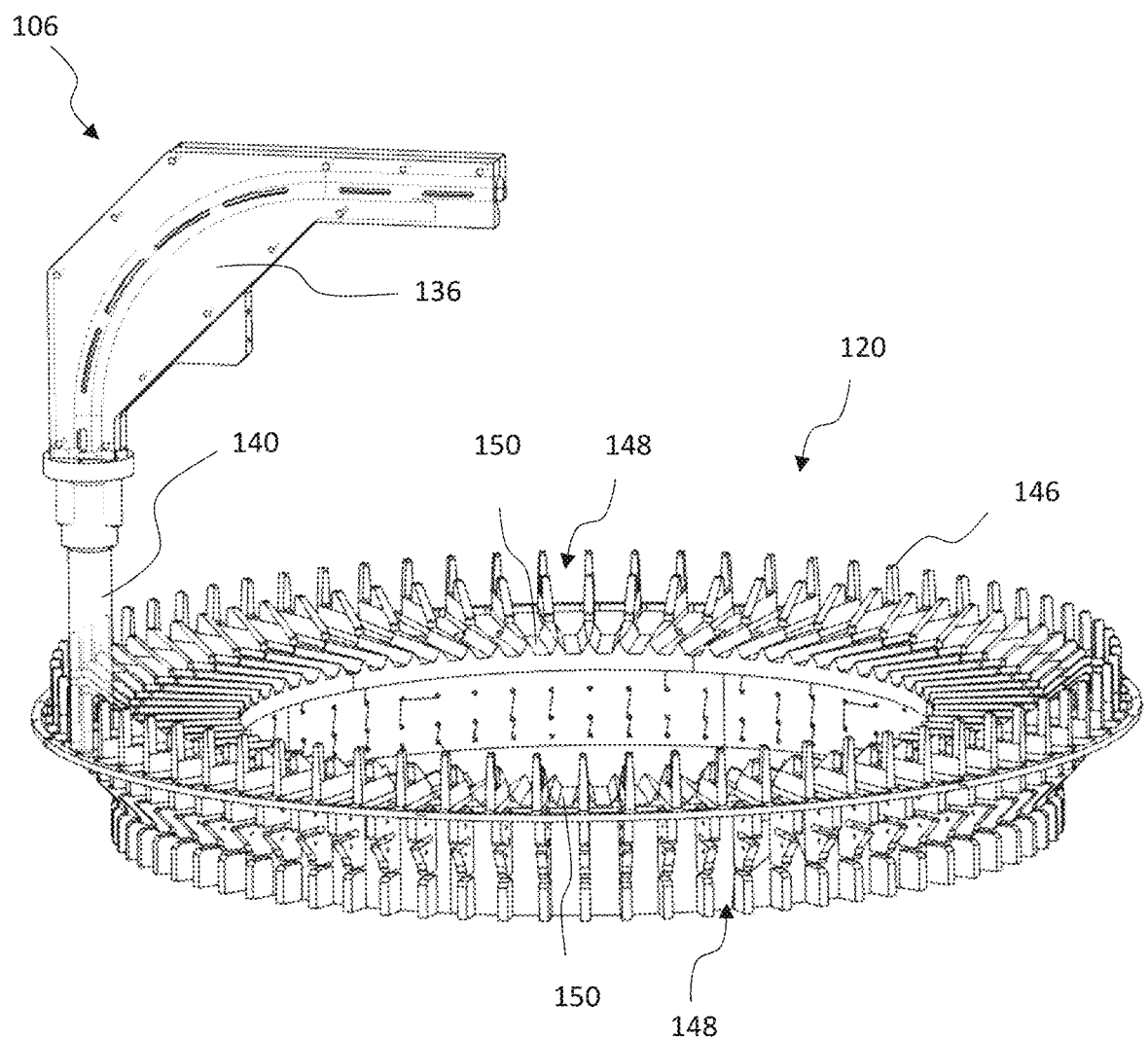
FIG. 7 is a perspective view depicting the relationship between the track, discharge tube, and pocketed separator in an embodiment of the present invention.
Figure 8:
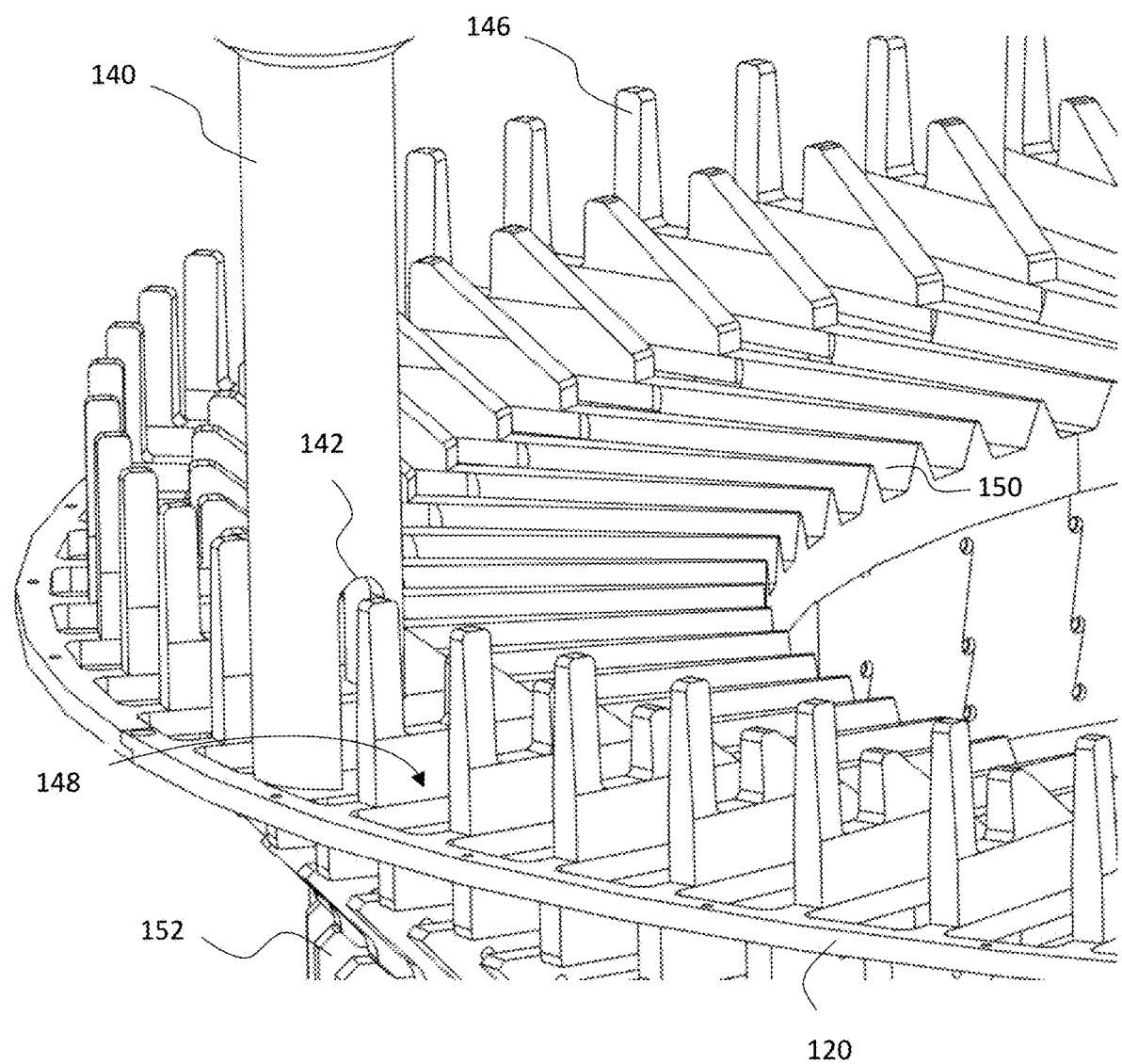
FIG. 8 is a closeup view of an embodiment of the discharge tube and a section of the pocketed separator.
Figure 9:
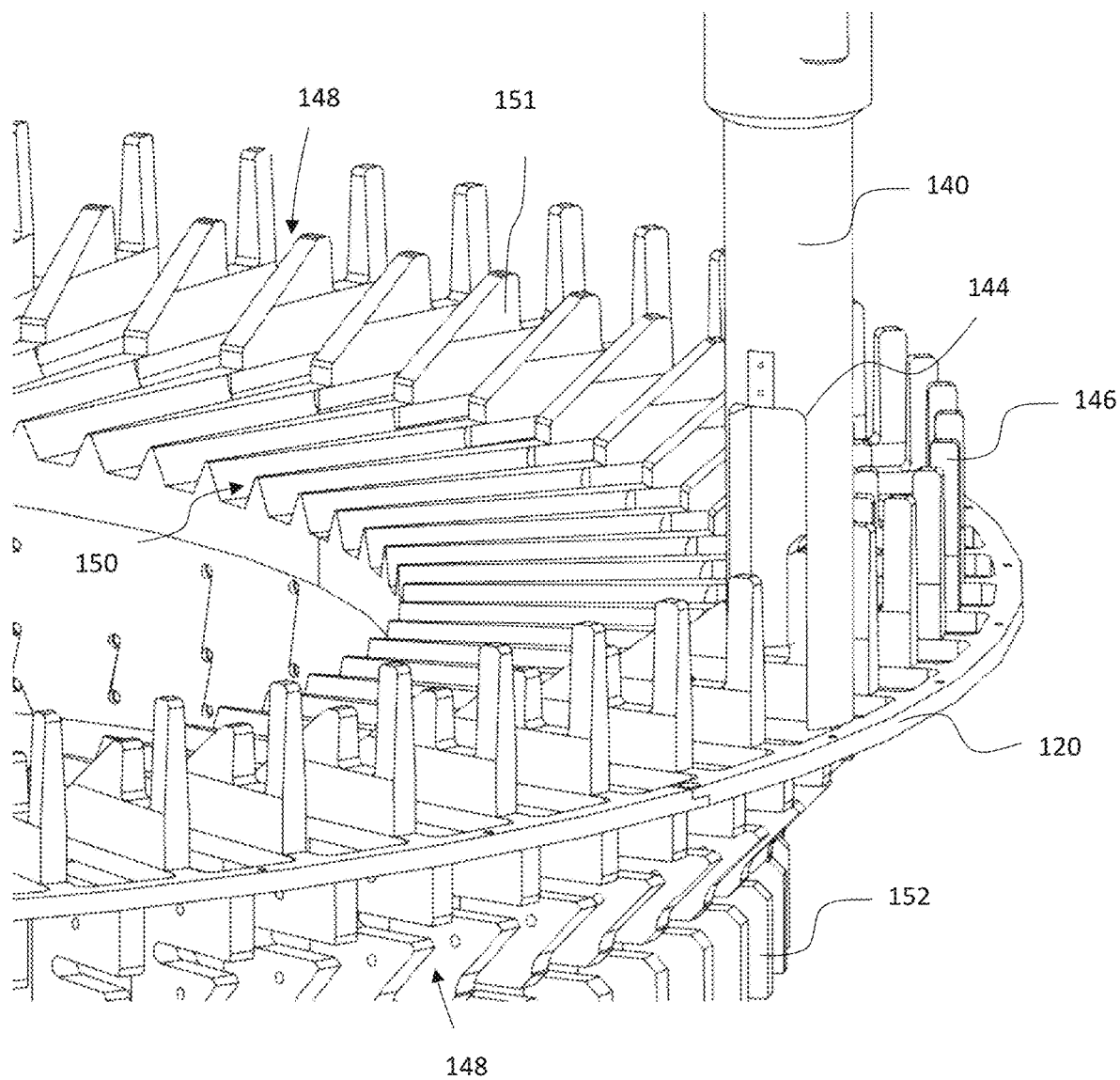
FIG. 9 is a closeup view of the discharge tube and a section of the pocketed separator.
Figure 10:
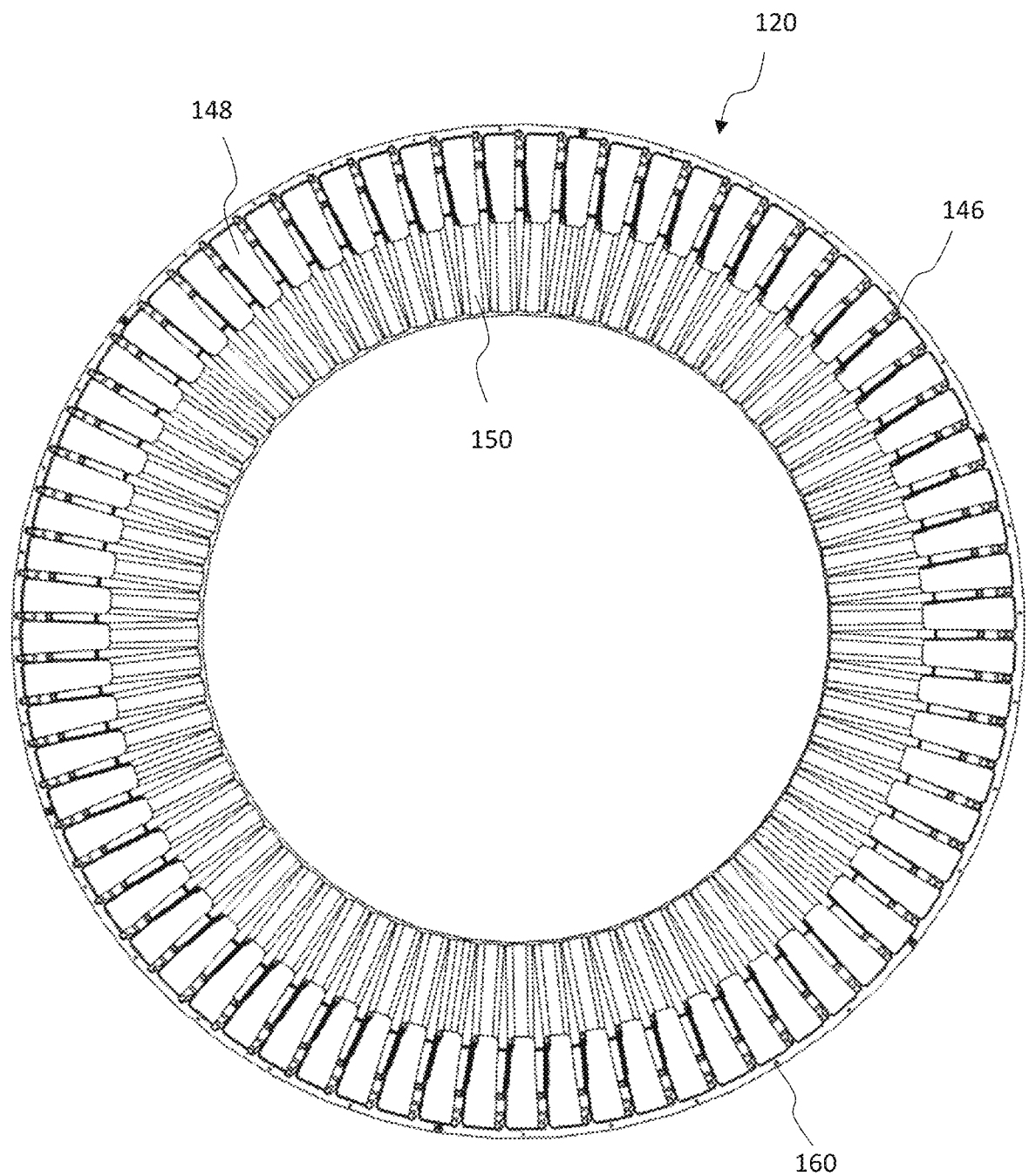
FIG. 10 is a top view of an embodiment of the pocketed separator.

As best depicted in FIGS. 4-6, an embodiment of initial feeding assembly 102 is a centrifugal feed system (also known as a "rotary feeder" or "descrambler"), which uses centrifugal force to initially orient the articles into end-to-end orientation. Initial feeding assembly 102 is generally bowl-shaped as established by upper opening 123, sidewalls 124, and bottom wall 126. Initial feeding assembly 102 uses rotating discs driven by motors to move the articles onto their sides to enter track 106. Bottom wall 126 rotates via rotational shaft 128 and motor 130 to drive articles to the outer edge of bowl rim 132.

Bowl rim 132 is configured to deliver articles through exit aperture 134 in one of sidewalls 124 and into track 106. Track 106 is sized to maintain the orientation of the articles in an end-to-end orientation. In addition, track 106 guides articles around a portion of sidewalls 124 and into gravitational section 136 of track 106. The length of the section of the track that traverses the perimeter of sidewalls 124 is based on the size of the article and the desired feed rate. In some embodiments, the track length does not exceed 135 degrees of upper feeder outside diameter for article 500.

Gravitational section 136 is a smooth downwardly curved section that guides the articles from initial feeding assembly 102, through top plate 122, and into upper housing 116 of feeder assembly 100. The length of gravitational section 136 of the track is based on the size of the article and the desired feed rate. In some embodiments, the length of the arc in gravitational section 136 is predetermined to prevent the article from having a 3-point contact. The curvature of gravitational section 136 of the track is based on the size of the article and the desired feed rate. In some embodiments, the degree of curvature is greater than 90 degrees.

Some embodiments include access slots 138 disposed in track 106, such as those depicted in gravitational section 136. In some embodiments, access slots allow sensors to monitor the feed rate of articles through track 106. The sensors may be any sensor known to a person of ordinary skill, including but not limited to laser sensors, camera sensors, and ultrasonic sensors.

In some embodiments of the present invention, the access slots 138 allow for additional article drivers (not shown) to interact with the articles and help control the flow of articles through track 106. In some embodiments, the article drivers are air jets that pass through access slots 138. The air jets use pressurized air to propel the articles through gravitational section 136. However, the article drivers can be any device or mechanism configured to help drive the flow of articles through track 106, including but not limited to mechanical, pneumatic, magnetic, electromagnetic mechanisms.

Track 106 further includes vertical discharge tube 140 downstream from gravity section 136. Vertical discharge tube 140 at least partially resides in uppers section 116 and is operably located to pocketed separator 120. Vertical discharge tube 140 is the last line of track 106 where the articles are passed on to pocketed separator 120.

Referring now to FIGS. 4-9, discharge tube 140 includes a tunnel extending from a front lateral side to a rear lateral side. The front lateral side is the side through which retention members 146 of pocketed separator 120 initially pass as pocketed separator 120 rotates. The rear lateral side is the side through which retention members 146 exit discharge tube 140 as pocketed separator 120 rotates. The tunnel provides a passage through which retention members 146 can pass as pocketed separator 120 rotates relative to stationary discharge tube 140.

As best depicted best in FIG. 4, the distal free end of discharge tube 140 includes inlet aperture 142 disposed in discharge tube 140's front lateral side. Inlet aperture 142 is sized and shaped to be slightly larger than retention members 146, such that there is minimal clearance to reduce the risk of an article accidentally exiting discharge tube 140 in a direction towards inlet aperture 142. Inlet aperture 142 is also preferably sized to be smaller than the article for the same reason.

The width (in a radial direction) of inlet aperture 142 is 0.3 inch to 0.5 inches larger than the inside diameter of the discharge tube 140. The height (in a vertical direction) of inlet aperture 142 is 0.75 times the size of the article. In some embodiments, the height of inlet aperture 142 is 0.5 to 1 times the height of the article. In some embodiments, the height of inlet aperture 142 is equal to or less than the height of the article.

As best depicted best in FIG. 5, the distal free end of discharge tube 140 also includes outlet aperture 144 disposed in discharge tube 140's rear lateral side. Outlet aperture 144 is sized and shaped to be significantly larger than the article to allow pocketed separator 120 to force the article to exit discharge tube 140 even if the article has not fully settled in a pocket while it is being rotated out of discharge tube 140. As a result, outlet aperture 144 is larger than inlet aperture 142.

In some embodiments, the width in a radial direction of outlet aperture 144 is substantially the same as the inside diameter of discharge tube 140.

The height (in a vertical direction) of outlet aperture 144 is dependent in part on the speed of rotation of pocketed separator 120 and the speed at which articles reach a location adjacent to outlet aperture 144. In some embodiments, outlet aperture 144 has a height at least as tall as the article. In some embodiments, the height of outlet aperture 144 is at least 1.25 times the height of the article. In some embodiments, the height of outlet aperture 144 is equal to or less than 1.5 times the height of the article. In some embodiments, the height of outlet aperture 144 is greater than 1.25 times the height of the article, but less than 2 times the height of the article. In some embodiments, the height of outlet aperture 144 is between 1.5 and 2 times the height of the article.

In some embodiments, discharge tube 140 is exchangeable. A plurality of discharge tubes can be supplied each with an outlet aperture of a different size/shape and/or an inlet aperture of a different size/shape. The correct discharge tube can be selected and secured to track 106 based on the desired feed rate, the size/shape of the article, and/or the size/shape of the retention members on pocketed separator 120.

As best depicted in FIGS. 7-10, discharge tube 140 resides in overlying relation to pocketed separator 120. The distal most free end (bottom end) of discharge tube 140 is open and fixed in position, while pocketed separator 120 rotates freely with respect to discharge tube 140. In some embodiments, discharge tube 140 may rotate while pocketed separator 120 remains stationary. In some embodiments, both may move to increase efficiencies.

Figure 11:
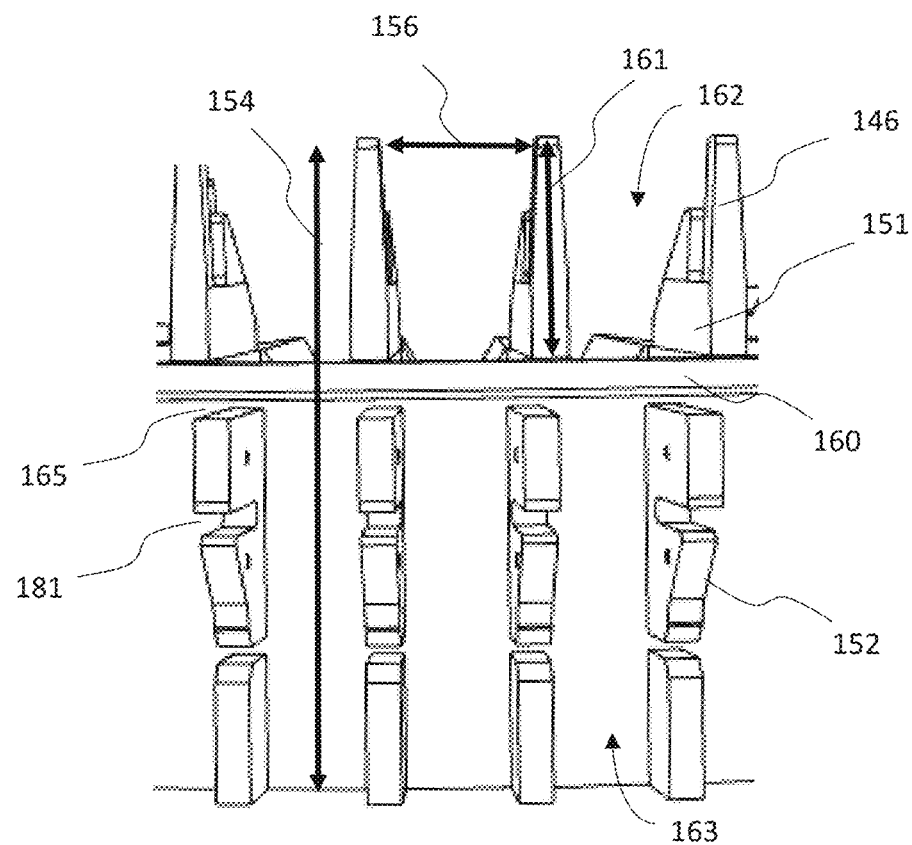
FIG. 11 is an elevation view of a section of an embodiment of the pocketed separator.

Pocketed separator 120 is generally ring shaped with a plurality of vertical pockets 148 and a plurality of radially extending trenches 150. Trenches 150 are in radial alignment with vertical pockets 148. As best depicted in FIG. 11, vertical pockets 148 are generally comprised of enclosure 160 separating upper pocket channel 162 from lower pocket channel 163. Upper pocket channels 162 are comprised at least partially by circumferentially spaced upper retention walls 151 and lower pocket channels 163 are comprised of circumferentially spaced lower retention walls 152. Enclosure 160 is designed to completely surround an article, while upper retention walls 151 and lower retention walls 152 are designed to only partially enclose an article, thereby allowing the article to exit the vertical pocket in the radial direction at certain locations as pocketed separator 120 rotates.

Vertical pockets 148 extend the height of pocketed separator 120 and reside between retention members 146 and lower retention walls 152. In some embodiments, the height of each vertical pocket 148 (represented by arrow 154 in FIG. 11) is at least as tall as the article. In some embodiments, the height of each vertical pocket 148 is at least twice as tall as the article. In some embodiments, the height of each vertical pocket 148 is more than double the height of the article in order to account for an inspection mechanism plate, which will be explained further in subsequent paragraphs. In some embodiments, the height of the lower pocket channels 163 are at least as tall as the article.

The width of each vertical pocket 148 (represented by arrow 156 in FIG. 11) is at least the width or diameter of the article. In some embodiments the width of each vertical pocket 148 is less than or equal to 1.5 times the width or diameter of the article, which enables the system to rotate at a faster rate and thereby increase the feed rate of the system. In some embodiments, the width of vertical pocket 148 is greater than the width of the articles, but less than the height of the articles, thereby ensuring that the articles cannot reside in vertical pocket 148 a non-vertical orientation.

In some embodiments, the depth of each enclosure 160 of vertical pocket 148 (as represented by arrow 159 in FIG. 12) is generally the length of the article being separated. In some embodiments, the depth of each enclosure 160 is at least half the length of the article. In some embodiments, the depth of each enclosure 160 is less than half of the length of the article.

Figure 12:
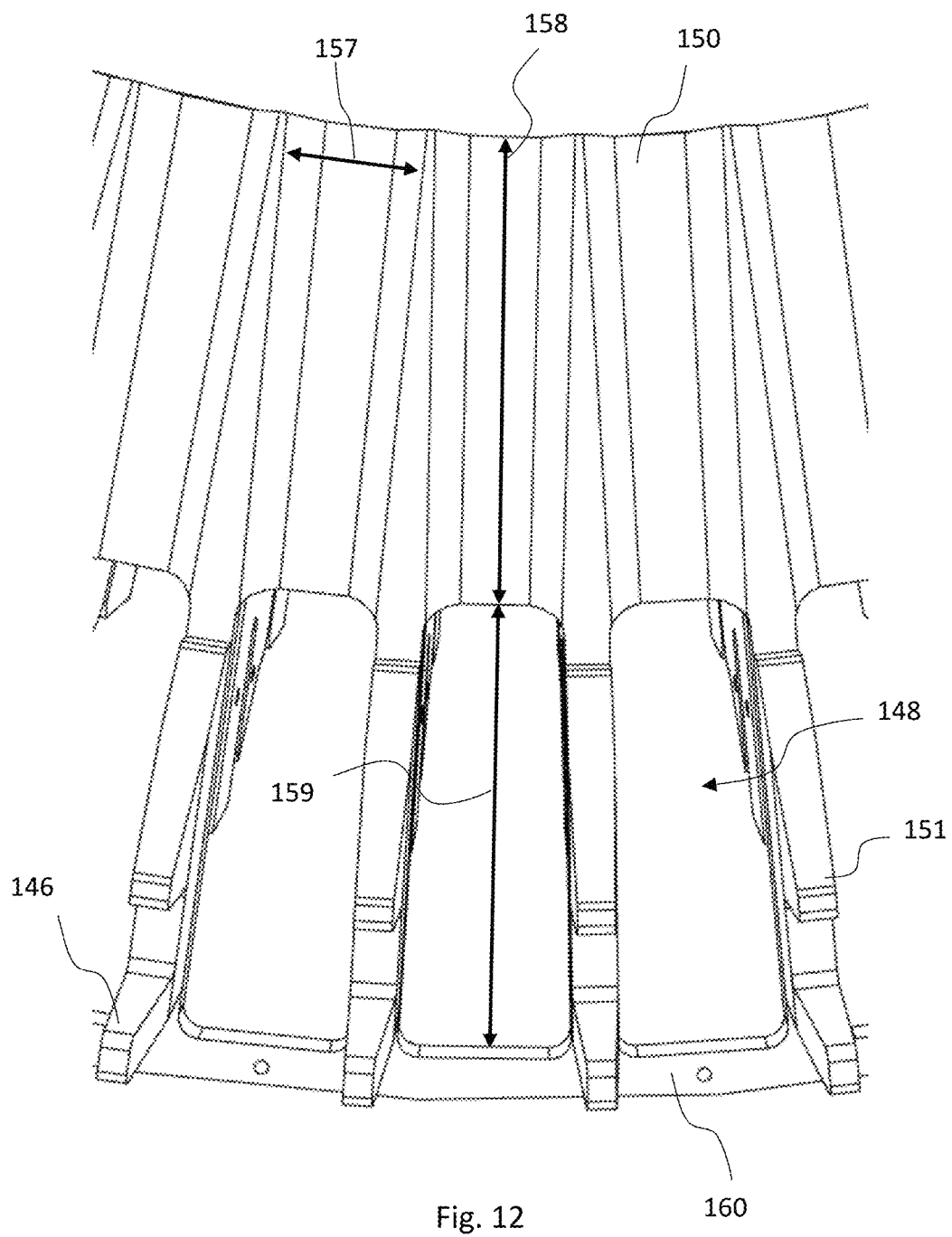
FIG. 12 is closeup top view of a section of an embodiment of the pocketed separator.

As best depicted in FIG. 12, trenches 150 extend generally in a radial direction with respect to pocketed separator 120 and are centripetally located with respect to vertical pockets 148. Trenches 150 have a size and shape sufficient to retain a predetermined article lying on its side as pocketed separator 120 rotates. In some embodiments, the length of each trench 150 (as represented by arrow 158 in FIG. 12) is generally length of the article. In some embodiments, the length of each trench is at least half the length of the article being separated. In some embodiments, the length of each trench is less than half of the length of the article. In some embodiments, the length of each trench is equal to or greater than the length of the article.

Referring back to FIGS. 8 and 9, retention members 146 extend towards discharge tube 140. In some embodiments, retention members 146 are generally vertical to match the vertical orientation of discharge tube 140. In addition, retention members 146 form a part of upper retention walls 151 or work in conjunction with upper retention walls 151 to retain discharged articles within vertical pockets 148. In other words, the plurality of vertical pockets 148 are delineated by retention members 146 and the corrugations that define trenches 150.

Retention members 146 are sized and shaped to pass through the tunnel in discharge tube 140 that extends inlet aperture 142 to outlet aperture 144. As a result, retention members freely rotate through discharge tube 140 while capturing the articles within pockets 148.

Moreover, retention members 146 are sized appropriately to remove an article of a predetermined size from the discharge tube as the pocketed separator 120 and the discharge tube 140 rotate relative to each other. In some embodiments, the height of each retention member 146 (as represented by arrow 161 in FIG. 11) is between 75% and 87.5% the height of the article. In some embodiments, the height of each retention member 146 is at least 75% the height of the article. In some embodiments, the height of each retention member 146 is at least 87.5% the height of the article.

Figure 13:
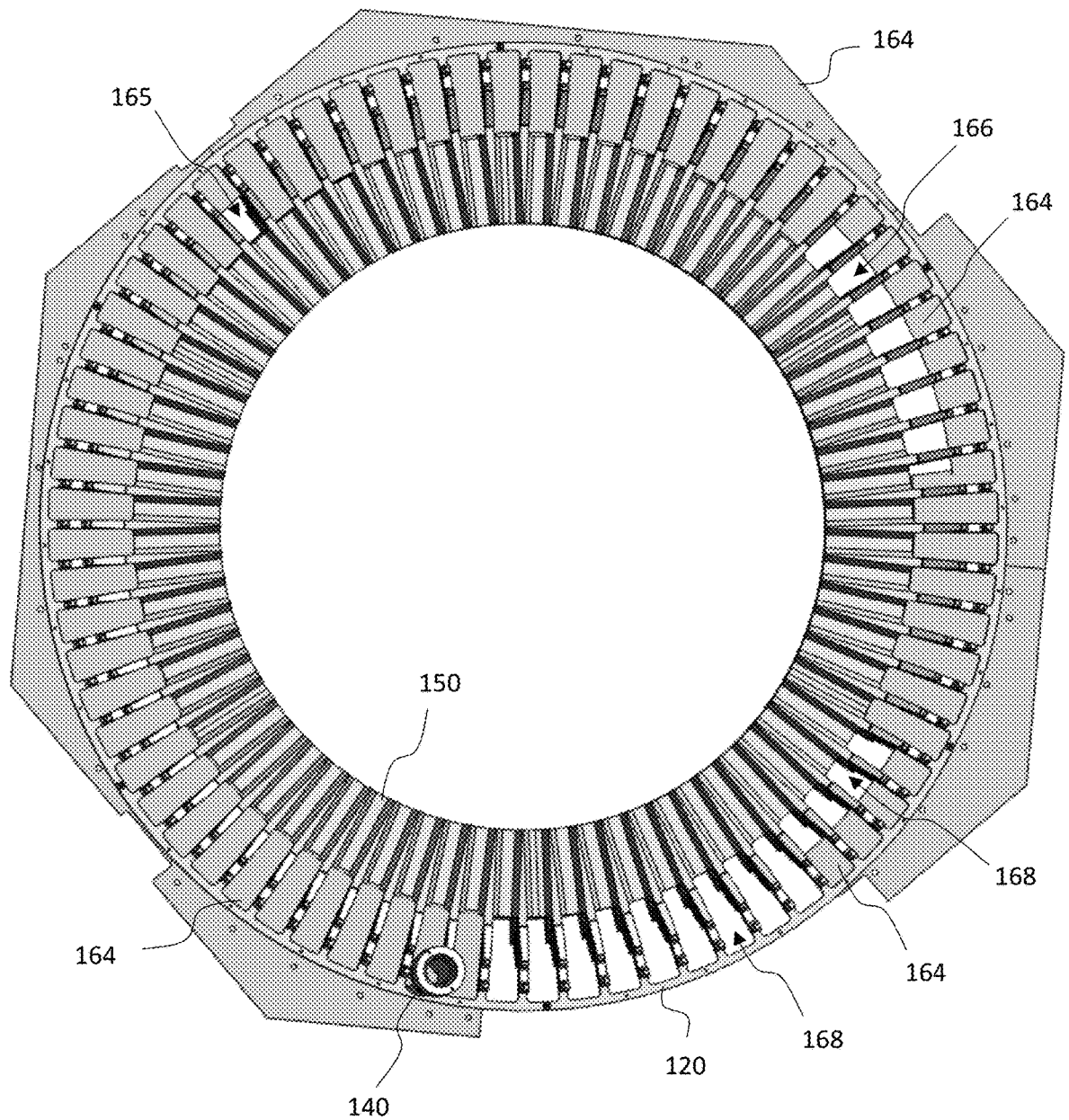
FIG. 13 is a top view of an embodiment of the pocketed separator with the divider floor.

Referring now to FIG. 13, an embodiment of the present invention includes divider floor 164, which separates upper pocket channels 162 from lower pocket channels 163. Divider floor 164 remains stationary with respect to pocketed separator 120 and thus, pocketed separator 120 includes grooves 165 in vertical pocket 146 so pocketed separator 120 can rotate with respect to divider floor 164. In addition, divider floor 164 includes a plurality of openings at predetermined locations to allow the articles to drop through divider floor 164 and into lower pocket channels 163. Moving clockwise from discharge tube 140, divider floor 164 includes openings 165, 166, and 168, which receive the articles based on the orientation of the articles as will be explained further below.

Figure 14:
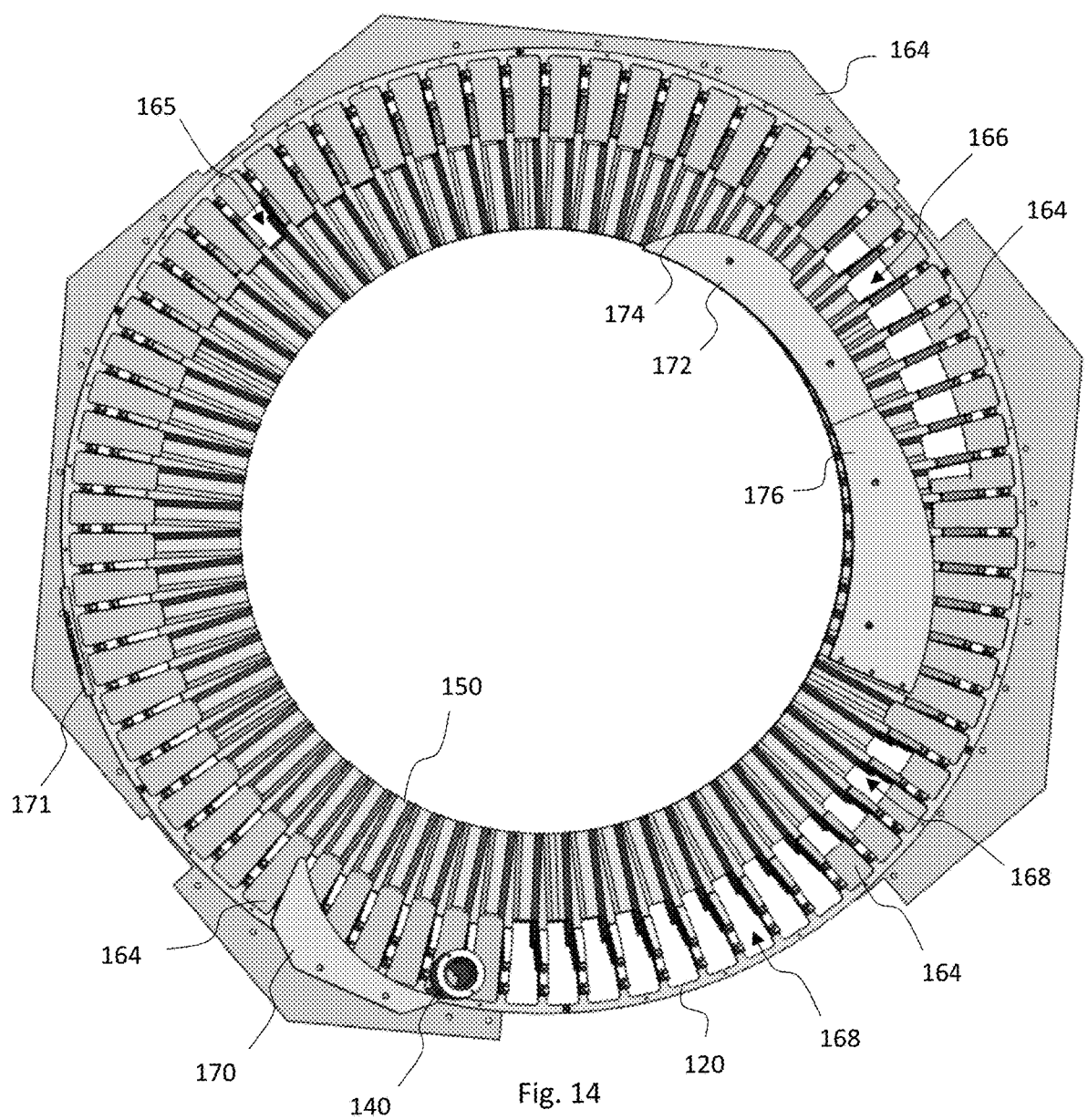
FIG. 14 is a top view of an embodiment of the pocketed separator with the divider floor and the various articles movers, including the knockdown cam, centripetal mover, and centrifugal cam/mover.

As depicted in FIG. 14, some embodiments of the present invention include one or more movers/cam mechanisms for manipulating the orientation and location of the articles when discharged on pocketed separator 120. The depicted movers include knockdown cam 170, centripetal mover 171, primary centrifugal cam 172, and secondary centrifugal cam 176. Some embodiments employ movers of alternative methods and mechanisms, including but not limited to, air jets, magnetic actuators, and electromagnetic actuators.

Figure 15:
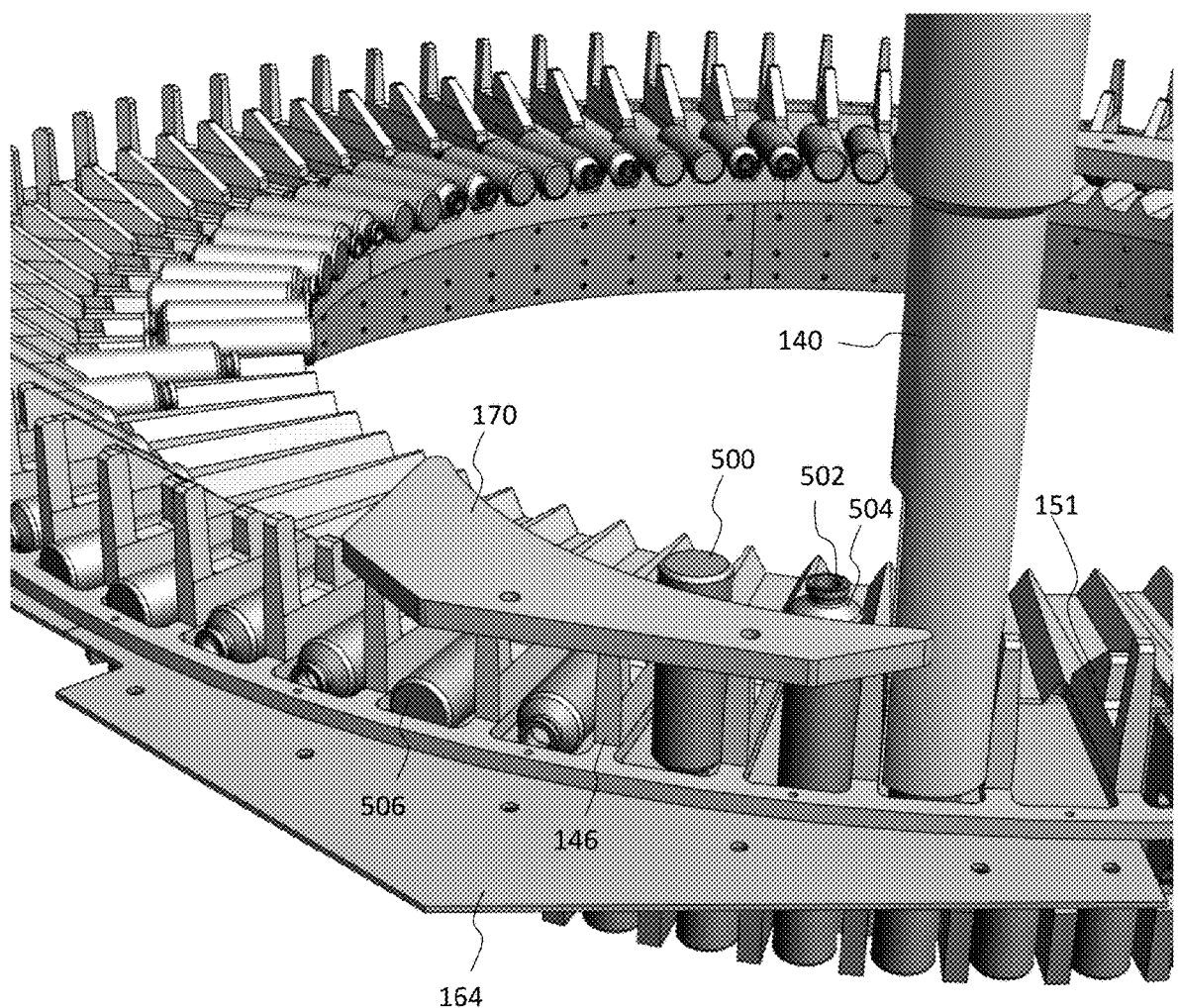
FIG. 15 is closeup perspective view of a section of an embodiment of the pocketed separator, the discharge tube, and the knockdown cam.

As shown in FIGS. 14 and 15, knockdown cam 170 is a stationary structural member configured to force articles 500 to fall onto their sides after articles 500 are discharged from discharge tube 140 and rotated into contact with knockdown cam 170. Preferably, knockdown cam 170 has a smooth curvature to allow for a smooth transition and prevent forceful binding of articles 500 with retention members 146 or upper retention walls 151.

Figure 16:
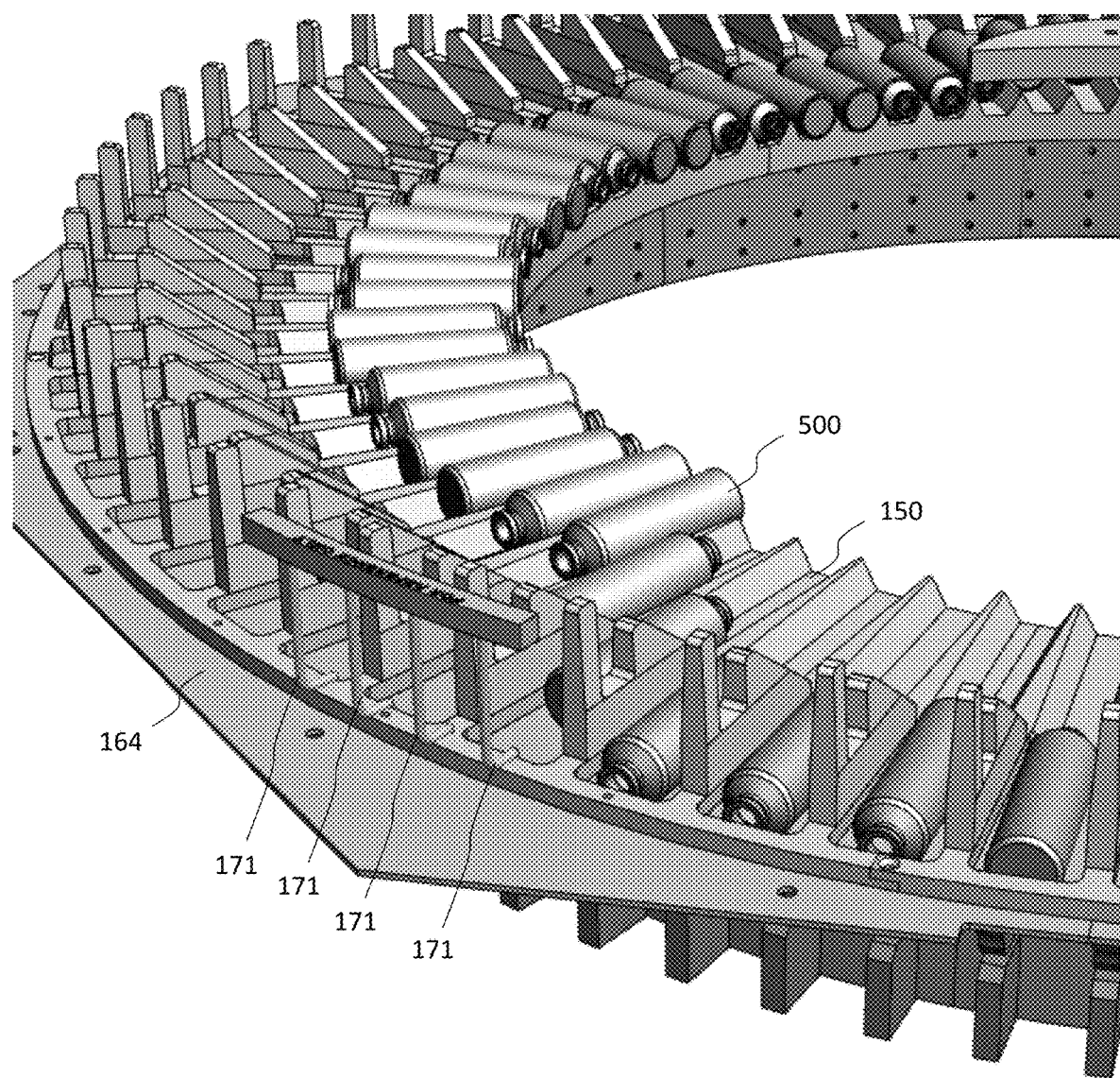
FIG. 16 is a closeup perspective view highlighting of a section of an embodiment of the pocketed separator and an embodiment of the centripetal mover.

As shown best in FIG. 16, some embodiments also include centripetal mover 171 that directs the articles towards the center rotational axis of pocketed separator 120 after knockdown cam 170 forces the articles onto their sides.

In some embodiments, centripetal mover 171 forces articles 500 completely into trenches 150. Centripetal mover 171 is in the form of several air nozzles connected to an air compressor (not shown to reduce clutter). However, centripetal mover 171 can be any mechanism or method configured to move the articles towards the center rotational axis of pocketed separator 120, including but not limited to cam mechanisms, air jets, magnetic actuators, electromagnetic actuators, and sloped bottom floors.

Figure 17:
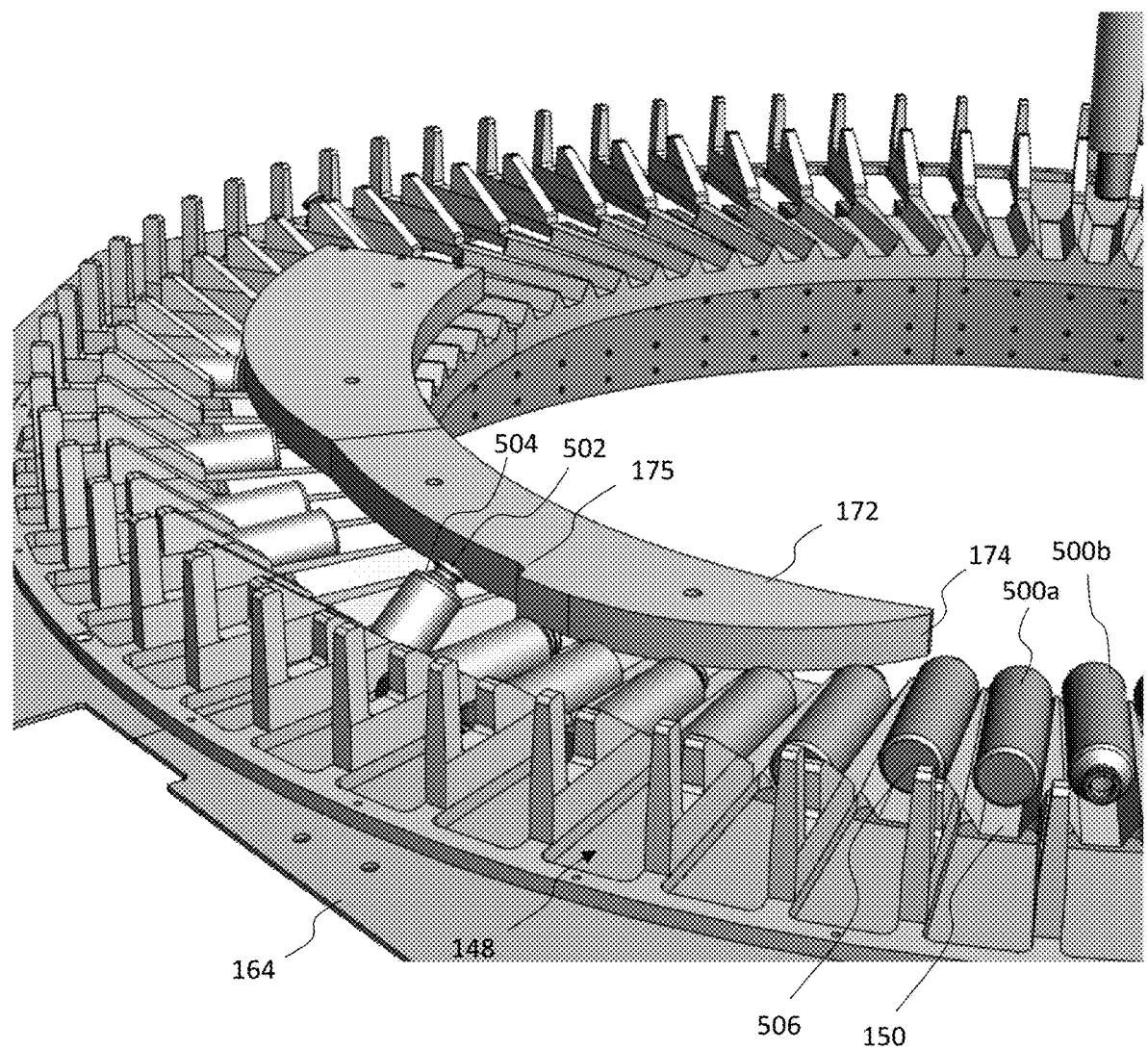
FIG. 17 is a closeup perspective view highlighting of a section of an embodiment of the pocketed separator and an embodiment of the centrifugal cam.
Figure 18:
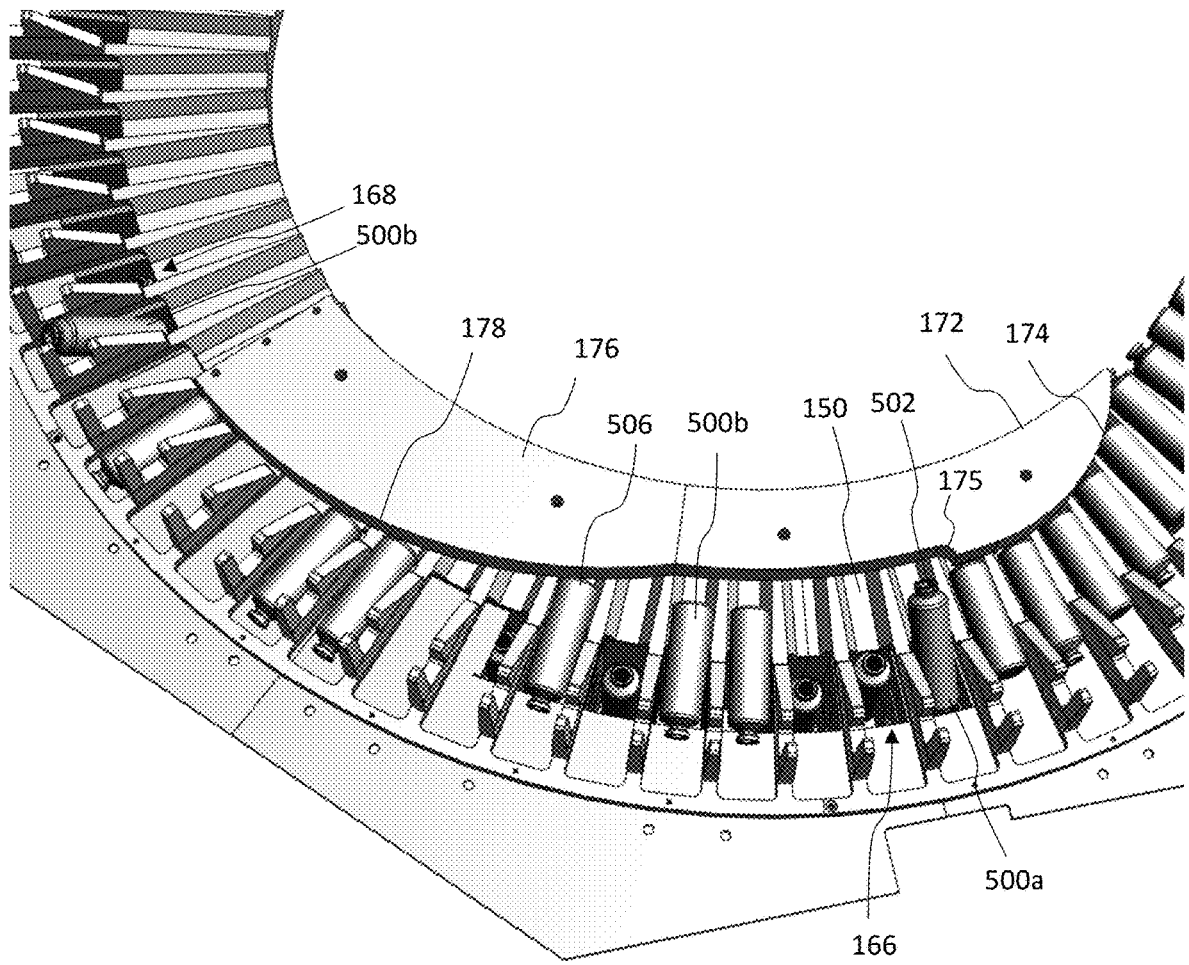
FIG. 18 is a closeup top view highlighting of a section of an embodiment of the pocketed separator and an embodiment of the centrifugal cam.

In continuing to move in a clockwise direction, some embodiments of the present invention include primary centrifugal cam 172 following knockdown cam 170 and/or the centripetal mover 171 as shown best in FIGS. 17-18. The exemplary depicted design of primary centrifugal cam 172 includes curved contacting surface 174, which gradually forced articles 500 from trench 150 towards vertical pocket 148 as pocketed separator 120 rotates articles 500 along curved contacting surface 174.

In some embodiments, as best depicted in FIG. 17, primary centrifugal cam 172 is vertically spaced from trench 150 to allow neck 502 of article 500 to pass under primary centrifugal cam 172, but not shoulder section 504 of article 500. In operation, neck 502 passes under primary centrifugal cam 172 while contacting surface 174 contacts shoulder 504 to force article 500 in a centrifugal direction. Moreover, centrifugal cam 172 has a size and shape to force properly oriented articles 500a a predetermined radial distance. The predetermined distance results in articles 500a in a partially overlying relation to openings 166 with the center of gravity of article 500a residing over opening 166 once pocketed separator 120 rotates articles 500a into overlying relation with opening 166.

In some embodiments, primary centrifugal cam 172 further includes cutback 175. As pocketed separator 120 continues to rotate, neck 502 reaches cutback 175 and the neck is released. Because the center of gravity resides over opening 166, properly oriented articles 500a fall into opening 166 and into lower pocket channel 163 in an upright orientation. It should be noted that sectional flooring 108 acts as a bottom floor for lower pocket channel 163. As such, sectional flooring 108 catches and retains articles 500 within lower channel 163.

Any inverted articles 500b, i.e., articles 500 with bottom end 506 residing more towards the central rotational axis than neck 502, will not pass into openings 166. When inverted, neck 502 faces away from the central rotational axis of pocketed separator 120. As a result, the neck cannot pass under primary centrifugal cam 172. Instead, contacting surface 174 contacts bottom end 506 and forces article 500b in a centrifugal direction further than the non-inverted articles 500a. Ultimately, primary centrifugal cam 172 forces neck 502 centrifugally/radially past opening 166 and articles 500b straddles opening 166, which is best depicted in FIG. 18. As a result, articles 500b do not fall into opening 166.

Figure 19:
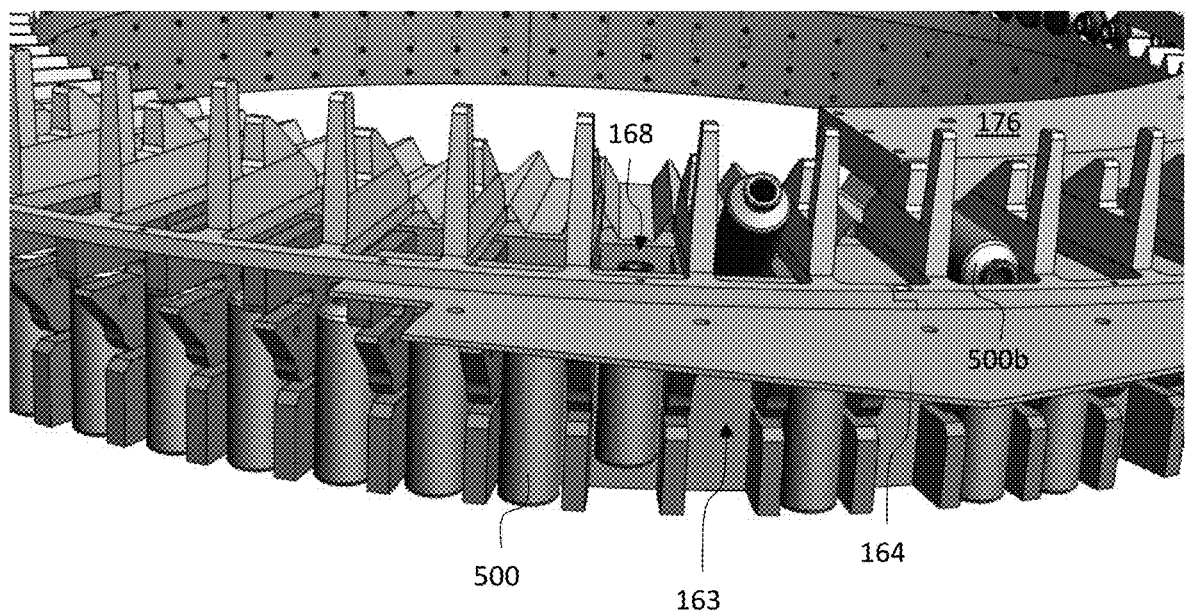
FIG. 19 is a closeup top view highlighting of a section of an embodiment of the pocketed separator and inverted articles falling into the lower pocket channels in an upright orientation.

Secondary centrifugal cam 176 circumferentially follows primary centrifugal cam 172 when moving in a clockwise direction. Secondary centrifugal cam 176 is configured to further force inverted articles 500b in a centrifugal direction. The exemplary depicted design of secondary centrifugal cam 176 includes curved contacting surface 178, which gradually forced articles 500b further in a centrifugal direction as pocketed separator rotates the articles along curved contacting surface 178. Secondary centrifugal cam 176 eventually forces articles 500b completely out of trench 150 so that bottom end 506 can fall into opening 168 when article 500 is rotated into overlying position with opening 168. As a result, inverted articles 500b fall into opening 168 and into lower pocket channel 163 in an upright orientation as shown in FIG. 19.

Figure 20:
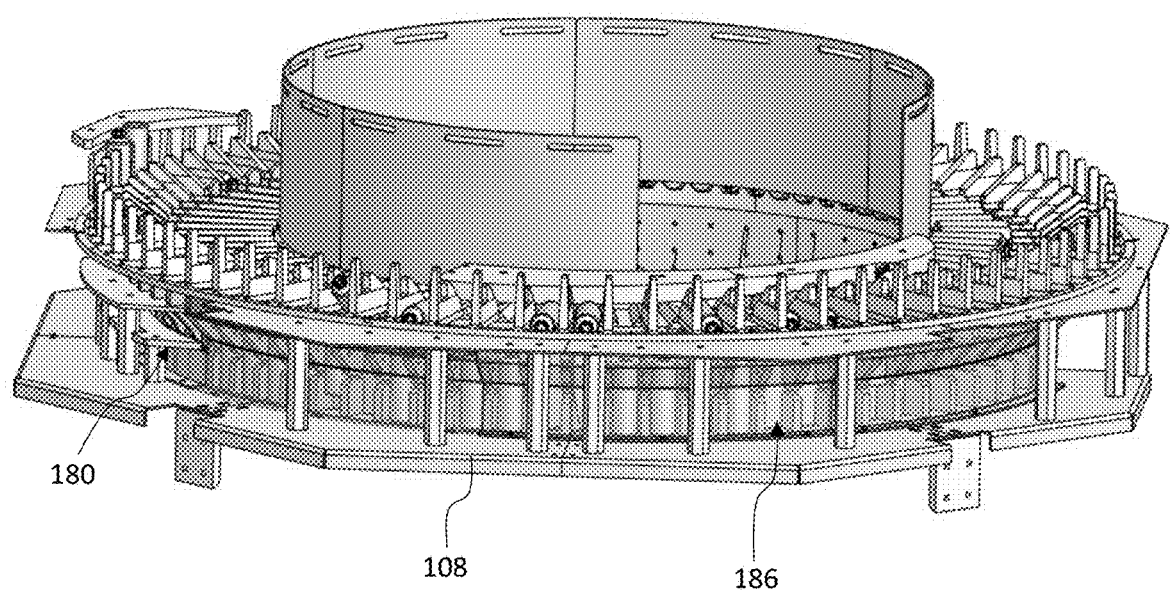
FIG. 20 is a perspective view of a section of an embodiment of the present invention highlighting the retainer wall.

As shown in FIG. 20, some embodiments further include retainer 186, such as a railing or enclosure wall, to retain articles that pass-through openings 166 and 168 into lower pocket channels 163. FIG. 20 depicts retainer wall 186 in a transparent manner; however, the wall need not be transparent and is depicted as such to provide clarity. Retainer wall 186 extends from openings 166 to inspection mechanism 180 when moving in a clockwise direction. Retainer 186 terminates prior to inspection mechanism 180 to allow for inspection mechanism 180 to discharge improperly oriented articles out of lower pocket channels 163.

Figure 21:
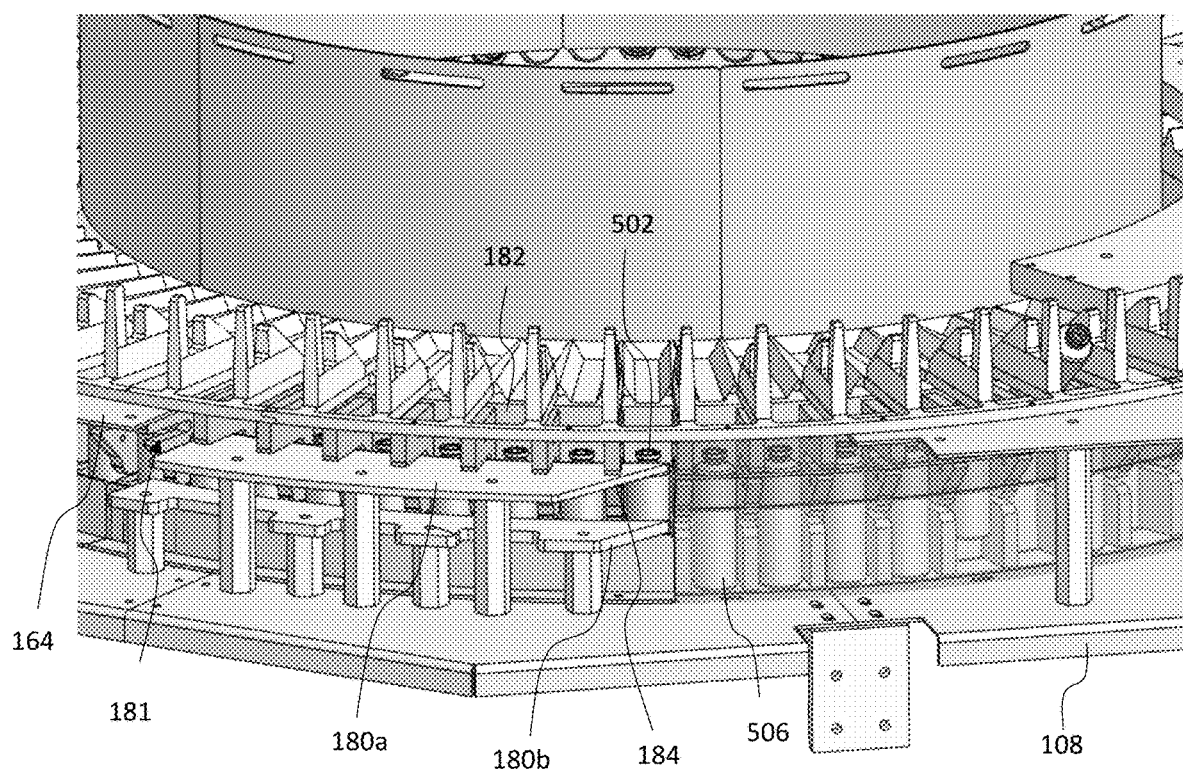
FIG. 21 is a close-up perspective view of a section of an embodiment of the present invention highlighting the inspection mechanism.

Referring now to FIG. 21, inspection mechanism 180 is circumferentially spaced from secondary centrifugal cam 176 when moving in a clockwise direction and resides below divider floor 164. In some embodiments, inspection mechanism 180 is comprised of upper member 180a and lower stabilizer 180b. Upper member 180a resides in groove 181 (see FIG. 11) and is centrifugally spaced from internal wall 182 a distance that is sufficient to allow passage of neck 502 between internal wall 182 and upper member 180a, but not allow passage of bottom end 506 if the article was inverted. Thus, articles that are properly in an upright orientation do not fall through the gap in sectional flooring 108 but instead upper member 180a is inserted between neck section 502 and shoulder section 504 and the article is carried over a gap in sectional flooring 108 which is larger than the cross section of the article. Lower stabilizer 180b ensures the article does not swing and remains in a vertical position without faltering.

However, articles that are in an inverted orientation (the bottom end vertically above the neck) fall into the beginning of the gap in sectional flooring 108. The gap is only large enough for neck section 502 to fall through but not shoulder section 504. This makes the article sit lower in pocket 163 and pass under upper member 180a. Once the article is under upper member 180a, the gap in the sectional flooring 108 is opened wider than the cross-sectional width of the article and the article drops through sectional flooring 108 and out of pocket 163. Some embodiments include a return pan (not shown) to catch the deflected articles. The return pan catches rejected articles and guides these articles back into initial feeding assembly 102 for recirculation or are stored for future disposal.

Figure 22:
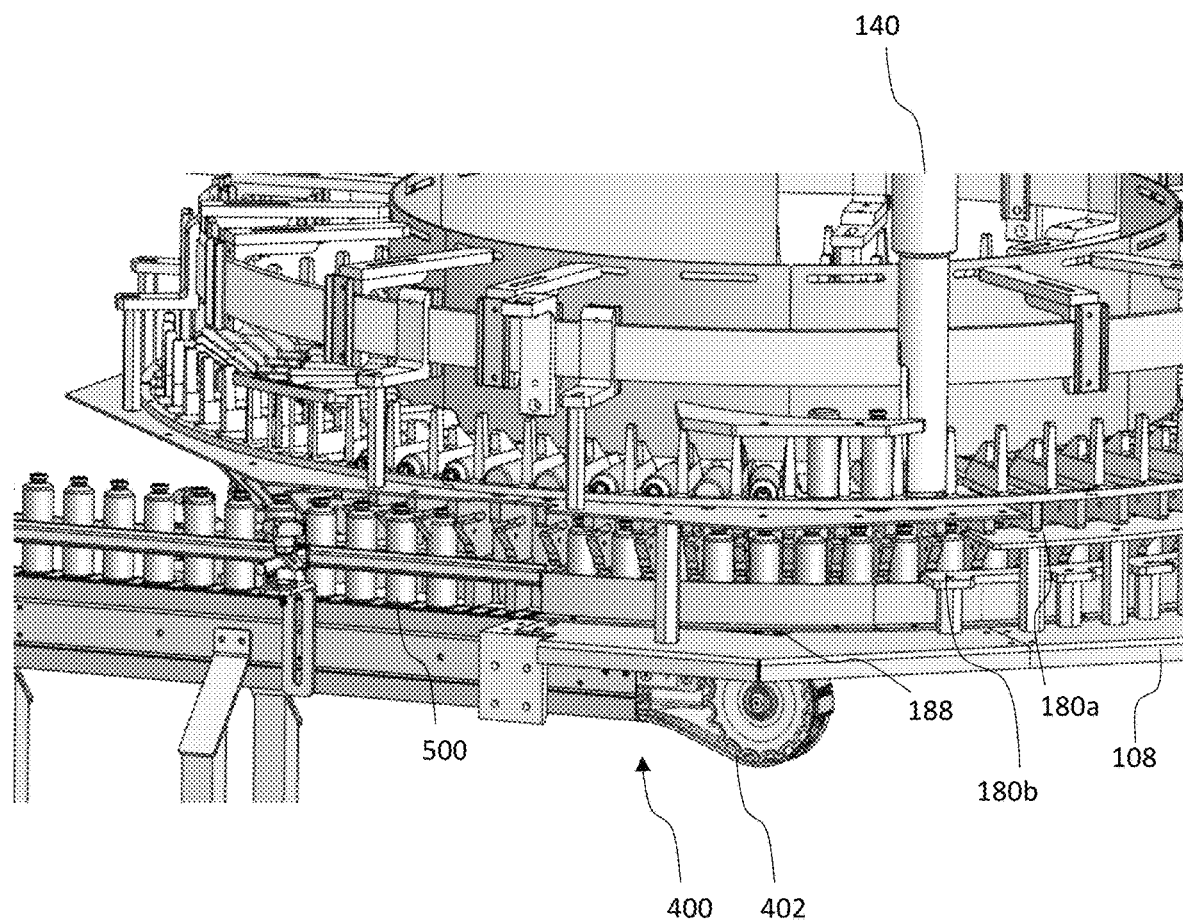
FIG. 22 is a close-up perspective view of a section of an embodiment of the present invention highlighting the relation of the conveyor system with the pocketed separator.

As shown in FIG. 22, as pocketed separator 120 continues to rotate in a clockwise direction, articles 500 are rotated towards opening 188 in sectional flooring 108. Conveyor assembly 400 includes conveyor belt 402, which occupies opening 188. When articles 500 are rotated onto conveyor belt 402, conveyor belt 402 pulls them from lower pocket channels 163 as pocketed separator 120 continues to rotate. Conveyor belt 402 then delivers articles 500 to their next destination in the production line.

While the present invention has generally been described as rotating in a clockwise direction, the direction of rotation, and thus circumferential organization of the components, can be reversed to allow the feeder assembly to operate in a counterclockwise direction.

Control System

In the following description, for the purposes of explanation, numerous specific details are set forth in order to provide a thorough understanding of embodiments of the present technology. It will be apparent, however, to one skilled in the art that embodiments of the present technology may be practiced without some of these specific details. The techniques introduced here can be embodied as special-purpose hardware (e.g. circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Some embodiments of the present invention include a control system for rotational motors 118 and 130, conveyor belt assembly 402 and hopper 300. Some embodiments further include sensors, such as those common in the industry, for detecting the feed rate of articles through track 106, onto pocketed separator 120, and/or onto conveyor belt 402. The sensors communicate with the control system, which optimizes the operation and flow of articles from the hopper, through the feeder assembly, and to the conveyor assembly.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An article feeder assembly, comprising:
    a separator, the separator including:
        a plurality of retention members, wherein a pair of adjacent retention members at least partially establishes a pocket;
    a discharge tube configured to deliver articles to the separator, the discharge tube including:
        a first end configured to receive articles and a second end proximate the separator for delivering articles to the separator, wherein a longitudinal axis extends through the discharge tube between the first and second ends;
        a tunnel extending laterally, with respect to the longitudinal axis, through the discharge tube;
        an inlet aperture establishing an entrance to the tunnel and an outlet aperture establishing an exit from the tunnel;
    at least the pocketed separator or discharge tube configured to move relative to each other and each of the plurality of retention members sized and shaped to pass through the inlet aperture, the tunnel, and the outlet aperture in the discharge tube when the pocketed separator and discharge tube move relative to each other;
    whereby an article located within the discharge tube at the second end of the discharge tube can be removed from the discharge tube when contacted by a retention member passing through the tunnel in the discharge tube.

2. The article feeder assembly of claim 1, further including an initial feeder assembly in overlying relation to the separator, wherein the initial feeder assembly is configured to deliver articles to the discharge tube in end-to-end orientation.

3. The article feeder assembly of claim 2, further including a track extending from the initial feeder assembly to the discharge tube.

4. The article feeder assembly of claim 1, wherein each retention member has a height in a vertical direction that is at least 75% the height of the article that is intended to be discharged from the discharge tube.

5. The article feeder assembly of claim 1, wherein the outlet aperture in the discharge tube is greater in height than the size of the inlet aperture in the discharge tube.

6. The article feeder assembly of claim 1, further including a knockdown cam wherein the knockdown cam is configured to force any standing articles onto their respective sides.

7. The article feeder assembly of claim 1, further including a plurality of trenches adjacently located with respect to one of a plurality vertical pockets in the separator.

8. The article feeder assembly of claim 7, further including a centripetal mover configured to force an article lying on the separator towards one of the plurality of trenches.

9. The article feeder assembly of claim 7, further including a centrifugal cam configured to force an article, lying in one of the plurality of trenches, into overlying relation to an opening in a divider floor such that articles fall into the opening in an upright orientation.

10. The article feeder assembly of claim 9, further including an advancing mechanism on which articles in an upright orientation are delivered.

11. An article feeder assembly, comprising:
    a pocketed separator, the pocketed separator including:
        a plurality of pockets;
        a plurality of retention members, wherein a pair of adjacent retention members at least partially establishes a pair of sidewalls of one of the pockets;
    a discharge tube configured to deliver articles in a vertical orientation onto the pocketed separator, the discharge tube including:
        a first end configured to receive articles and a second end proximate the pocketed separator for delivering articles to the pocketed separator;
        a tunnel extending laterally through the second end of the discharge tube;
        an inlet aperture establishing an entrance to the tunnel and an outlet aperture establishing an exit from the tunnel;
        wherein the outlet aperture in the discharge tube is greater in height than the size of the inlet aperture in the discharge tube;
    at least the pocketed separator or discharge tube configured to move relative to each other;
    whereby articles exiting the discharge tube are received in the pockets of the pocketed separator as the pocketed separator and the discharge tube move relative to each other.

12. The article feeder assembly of claim 11, further including:
    the plurality of retention members sized and shaped to pass through the inlet aperture, the tunnel, and the outlet aperture in the discharge tube when the pocketed separator rotates relative to the discharge tube;
    whereby an article located within the discharge tube at the second end of the discharge tube can be rotated out of the outlet aperture of the discharge tube when contacted by a retention member passing through the tunnel in the discharge tube.

13. The article feeder assembly of claim 11, further including:
   an initial feeder assembly in overlying relation to the pocketed separator, wherein the initial feeder assembly is configured to deliver articles to the discharge tube in end-to-end orientation; and
   a track extending from the initial feeder assembly to the discharge tube.

14. The article feeder assembly of claim 11, wherein each retention member has a height in a vertical direction that is at least 75% the height of the article that is intended to be discharged from the discharge tube.

15. The article feeder assembly of claim 11, further including a knockdown cam wherein the knockdown cam is configured to force any articles standing vertically on the pocketed separator onto their respective sides.

16. The article feeder assembly of claim 11, further including a plurality of trenches adjacently located with respect to the plurality pockets, wherein each trench is radially aligned with a radially adjacent pocket.

17. The article feeder assembly of claim 16, further including a centripetal mover configured to force an article lying on the pocketed separator onto one of the plurality of trenches.

18. The article feeder assembly of claim 16, further including a centrifugal cam configured to force an article, lying in one of the plurality of trenches, into overlying relation to an opening in a divider floor such that articles fall into the opening in an upright orientation.

19. An article feeder assembly, comprising:
   a pocketed separator, the pocketed separator including a plurality of vertical pockets;
   a plurality of retention members, wherein a pair of adjacent retention members at least partially establishes a pair of sidewalls of one of the vertical pockets;
   a plurality of trenches adjacently located with respect to the plurality pockets, wherein each trench is radially aligned with a radially adjacent pocket;
   a discharge tube configured in a generally vertical orientation to deliver articles in a vertical orientation onto the pocketed separator, the discharge tube including a first end configured to receive articles and a second end proximate the pocketed separator for delivering articles to the pocketed separator;
   at least the pocketed separator or discharge tube configured to move relative to each other;
   whereby articles exiting the discharge tube are received in the pockets of the pocketed separator as the pocketed separator and the discharge tube move relative to each other.

* * * * *